United States Patent
Nishiyama et al.

(10) Patent No.: US 9,196,253 B2
(45) Date of Patent: Nov. 24, 2015

(54) INFORMATION PROCESSING APPARATUS FOR ASSOCIATING SPEAKER IDENTIFICATION INFORMATION TO SPEECH DATA

(71) Applicant: KABUSHIKI KAISHA TOSHIBA, Minato-ku, Tokyo (JP)

(72) Inventors: Osamu Nishiyama, Kanagawa (JP); Taira Ashikawa, Kanagawa (JP); Tomoo Ikeda, Tokyo (JP); Kouji Ueno, Kanagawa (JP); Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 13/960,232

(22) Filed: Aug. 6, 2013

(65) Prior Publication Data

US 2014/0046666 A1    Feb. 13, 2014

(30) Foreign Application Priority Data

Aug. 10, 2012   (JP) .................................. 2012-179023

(51) Int. Cl.
| | | |
|---|---|---|
| *G10L 15/00* | (2013.01) | |
| *G10L 17/00* | (2013.01) | |
| *G10L 17/02* | (2013.01) | |
| *G10L 17/06* | (2013.01) | |

(52) U.S. Cl.
CPC ................ *G10L 17/02* (2013.01); *G10L 17/06* (2013.01)

(58) Field of Classification Search
USPC .............................................. 704/246–250
See application file for complete search history.

(56) References Cited

U.S. PATENT DOCUMENTS

| | | | | |
|---|---|---|---|---|
| 6,317,710 | B1 * | 11/2001 | Huang et al. ................... | 704/246 |
| 6,477,491 | B1 * | 11/2002 | Chandler et al. .............. | 704/235 |
| 6,754,631 | B1 * | 6/2004 | Din ................................. | 704/270 |
| 8,243,902 | B2 * | 8/2012 | Caspi et al. .............. | 379/202.01 |

FOREIGN PATENT DOCUMENTS

| | | | | |
|---|---|---|---|---|
| JP | 2004-015584 | | 1/2004 | |
| JP | 2010-060850 | * | 3/2010 | ............... G10L 17/00 |
| JP | 2012-123603 | * | 6/2012 | ............... G06F 17/30 |

OTHER PUBLICATIONS

Office Action of Notice of Rejection for Japanese Patent Application No. 2012-179023 Dated Aug. 5, 2014, 5 pages.

* cited by examiner

*Primary Examiner* — Jesse Pullias
(74) *Attorney, Agent, or Firm* — Amin, Turocy & Watson, LLP

(57) ABSTRACT

According to an embodiment, an information processing apparatus includes a dividing unit, an assigning unit, and a generating unit. The dividing unit is configured to divide speech data into pieces of utterance data. The assigning unit is configured to assign speaker identification information to each piece of utterance data based on an acoustic feature of the each piece of utterance data. The generating unit is configured to generate a candidate list that indicates candidate speaker names so as to enable a user to determine a speaker name to be given to the piece of utterance data identified by instruction information, based on operation history information in which at least pieces of utterance identification information, pieces of the speaker identification information, and speaker names given by the user to the respective pieces of utterance data are associated with one another.

8 Claims, 23 Drawing Sheets

FIG.2

| UTTERANCE ID | START TIMING | END TIMING | SPEAKER ID |
|---|---|---|---|
| 1 | 0:00:03 | 0:00:05 | A |
| 2 | 0:00:06 | 0:00:09 | B |
| 3 | 0:00:12 | 0:00:17 | C |
| 4 | 0:00:18 | 0:00:20 | A |
| 5 | 0:00:21 | 0:00:23 | D |
| 6 | 0:00:23 | 0:00:28 | C |
| 7 | 0:00:29 | 0:00:31 | E |

FIG.3

| UTTERANCE ID | SPEAKER ID | SPEAKER NAME |
|---|---|---|
| 1 | A | PRESENTER |
| 2 | B | JOURNALIST |
| 3 | C | LEADING PERFORMER |
| 4 | A | PRESENTER |

FIG.5

| SPEAKER NAME | SPEAKER ID | FIRST PROBABILITY |
|---|---|---|
| PRESENTER | A | 1.0 |
| JOURNALIST | B | 1.0 |
| LEADING PERFORMER | C | 1.0 |

FIG.6

| PREVIOUS \ SUBSEQUENT | PRESENTER | JOURNALIST | LEADING PERFORMER | <NEW> |
|---|---|---|---|---|
| PRESENTER | 0 | 1.0 | 0 | 1.0 |
| JOURNALIST | 0 | 0 | 1.0 | 1.0 |
| LEADING PERFORMER | 1.0 | 0 | 0 | 0 |

FIG.7

| SPEAKER NAME | SCORE | FIRST PROBABILITY | SECOND PROBABILITY |
|---|---|---|---|
| PRESENTER | 0 | 0 | 0 |
| JOURNALIST | 1.0 | 0 | 1.0 |
| LEADING PERFORMER | 0 | 0 | 0 |
| <NEW> | 2.0 | 1.0 | 1.0 |

FIG.8

| PRIORITY | SPEAKER NAME |
|---|---|
| 1 | <NEW> |
| 2 | JOURNALIST |
| 3 | LEADING PERFORMER |
| 3 | PRESENTER |

FIG.10

| START TIMING | SPEAKER NAMES | UTTERED CONTENTS |
|---|---|---|
| 0:00:00 | PRESENTER | I WOULD NOW LIKE TO BEGIN THE PRESS CONFERENCE. THOSE WHO HAVE QUESTIONS, PLEASE RAISE YOUR HAND. YES, THAT JOURNALIST THERE. |
| 0:00:05 | JOURNALIST | I AM Q WORKING FOR NEWSPAPER P. IT IS THE FIRST TIME THAT YOU ARE THE LEADING PERFORMER. PLEASE TELL US ABOUT YOUR EXCITEMENT. |
| 0:00:11 | LEADING PERFORMER | I HAVE GOT MY FIRST CHANCE AFTER TURNING 50. SO, I WISH TO APPLY ALL MY ACTING EXPERIENCE TILL DATE, USE THE ACTING TECHNIQUES THAT I HAVE LEARNT, AS WELL AS PUT MY LIFE EXPERIENCES TO USE. |
| 0:00:18 | PRESENTER | WHO'S NEXT? PLEASE RAISE YOUR HAND. YES, THAT JOURNALIST OVER THERE, GO AHEAD WITH YOUR QUESTION. |
| 0:00:20 | JOURNALIST | I AM S WORKING FOR NEWSPAPER R. DIRECTOR U IS KNOWN TO BE STRICT REGARDING ACTING. HOW WAS THE EXPERIENCE TO WORK UNDER DIRECTOR U? |
|  |  |  |

FIG.11

| UTTERANCE ID | SPEAKER ID | SPEAKER NAME |
|---|---|---|
| 1 | A | PRESENTER |
| 2 | B | JOURNALIST |
| 3 | C | LEADING PERFORMER |
| 4 | A | PRESENTER |
| 5 | D | JOURNALIST |

FIG.12

| PRIORITY | SPEAKER NAME |
|---|---|
| 1 | JOURNALIST |
| 2 | <NEW> |
| 3 | LEADING PERFORMER |
| 3 | PRESENTER |

FIG.19

| SPEAKER NAME \ SPEAKER IDENTIFICATION INFORMATION | NEWSPAPER R | S |
|---|---|---|
| PRESENTER | 0 | 0 |
| JOURNALIST | 1.0 | 1.0 |
| LEADING PERFORMER | 0 | 0 |

FIG.20

| SPEAKER NAME | SCORE | FIRST PROBABILITY | SECOND PROBABILITY | THIRD PROBABILITY |
|---|---|---|---|---|
| PRESENTER | 0 | 0 | 0 | 0 |
| JOURNALIST | 3.0 | 0 | 1.0 | 2.0 |
| LEADING PERFORMER | 0 | 0 | 0 | 0 |
| <NEW> | 2.0 | 1.0 | 1.0 | 0 |

FIG.24

| SPEAKER NAME | FOURTH PROBABILITY |
|---|---|
| PRESENTER | 0 |
| JOURNALIST | 1.0 |
| LEADING PERFORMER | 0 |
| <NEW> | 0 |

FIG.25

| SPEAKER NAME | SCORE | FIRST PROBABILITY | SECOND PROBABILITY | FOURTH PROBABILITY |
|---|---|---|---|---|
| PRESENTER | 0 | 0 | 0 | 0 |
| JOURNALIST | 2.0 | 0 | 1.0 | 1.0 |
| LEADING PERFORMER | 0 | 0 | 0 | 0 |
| <NEW> | 2.0 | 1.0 | 1.0 | 0 |

INFORMATION PROCESSING APPARATUS FOR ASSOCIATING SPEAKER IDENTIFICATION INFORMATION TO SPEECH DATA

CROSS-REFERENCE TO RELATED APPLICATION

This application is based upon and claims the benefit of priority from Japanese Patent Application No. 2012-179023, filed on Aug. 10, 2012; the entire contents of which are incorporated herein by reference.

FIELD

Embodiments described herein relate generally to an information processing apparatus, a computer program product, and an information processing method.

BACKGROUND

Typically, speech data containing utterance data of a plurality of speakers is reproduced. Then, a user writes down the utterance data of each speaker in the form of a text and gives a speaker name of the corresponding speaker to each piece of utterance data. Moreover, there is also known a device that supports the user in the task of setting speaker names.

For example, a typical device classifies the speech data on the basis of speech features. Then, for each piece of speech data that is obtained by classification, the typical device assigns arbitrary speaker identification information and outputs the pieces of speech data so as to support the user in the task of setting speaker names. Moreover, in a typical device; speaker information, customer names, and speech data are stored in a corresponding manner on a customer-by-customer basis. Then, the typical device compares the speech data included in newly-received speaker information with the speech data that has been stored in advance, and accordingly displays a list of customers corresponding to the speech data having a high degree of phonetic similarity. Then, the user selects a customer name from the displayed list and gives a customer name to the speech data to which a customer name is to be given.

However, there are times when the speech features of speech data change according to the physical condition of the speaker. For that reason, there are times when the speaker identification information or the customer name obtained from the speech features or from the degree of phonetic similarity is different than the speaker corresponding to the utterance data to which a speaker name is to be given. That results in a lack of accuracy. As a result, there are times when it takes a lot of effort by the user to correct the speaker identification information that has been displayed or to correct the customer name that has been displayed. In this way, typically, it has been difficult to provide information that easily enables giving a speaker name to the utterance data to which a speaker name is to be given.

BRIEF DESCRIPTION OF THE DRAWINGS

FIG. 2 is a schematic diagram illustrating an exemplary data structure of first data;
FIG. 3 is a schematic diagram illustrating an exemplary data structure of operation history information;
FIG. 5 is an explanatory diagram for explaining first probabilities;
FIG. 6 is an explanatory diagram for explaining second probabilities;
FIG. 7 is an explanatory diagram for explaining score calculation performed according to the first embodiment;
FIG. 8 is a schematic diagram illustrating an exemplary data structure of a candidate list;
FIG. 10 is a schematic diagram illustrating an exemplary setting screen;
FIG. 11 is a schematic diagram of an exemplary data structure of the operation history information;
FIG. 12 is a schematic diagram illustrating an example of the candidate list;
FIG. 19 is an explanatory diagram for explaining third probabilities;
FIG. 20 is an explanatory diagram for explaining score calculation performed according to the second embodiment;
FIG. 24 is an explanatory diagram for explaining fourth probabilities;
FIG. 25 is an explanatory diagram for explaining score calculation performed according to the third embodiment.

DETAILED DESCRIPTION

According to an embodiment, an information processing apparatus includes a first receiving unit, a dividing unit, an assigning unit, a second receiving unit, and a generating unit. The first receiving unit is configured to receive speech data containing pieces of utterance data of speakers. The dividing unit is configured to divide the speech data into the pieces of utterance data. The assigning unit is configured to assign speaker identification information to each piece of utterance data based on an acoustic feature of the each piece of utterance data. The second receiving unit is configured to receive, from a user, instruction information that indicates a piece of utterance data to which a speaker name is to be given from among the pieces of utterance data included in the speech data. The generating unit is configured to generate a candidate list that indicates candidate speaker names so as to enable the user to determine a speaker name to be given to the piece of utterance data identified by the instruction information, based on operation history information in which at least pieces of utterance identification information for identifying the respective pieces of utterance data, pieces of the speaker identification information that has been assigned to the respective pieces of utterance data, and speaker names given by the user to the respective pieces of utterance data identified by the pieces of speaker identification information are associated with one another.

Exemplary embodiments of an information processing apparatus, a computer program product, and an information processing method are described in detail with reference to the accompanying drawings.

First Embodiment

Figure 1:
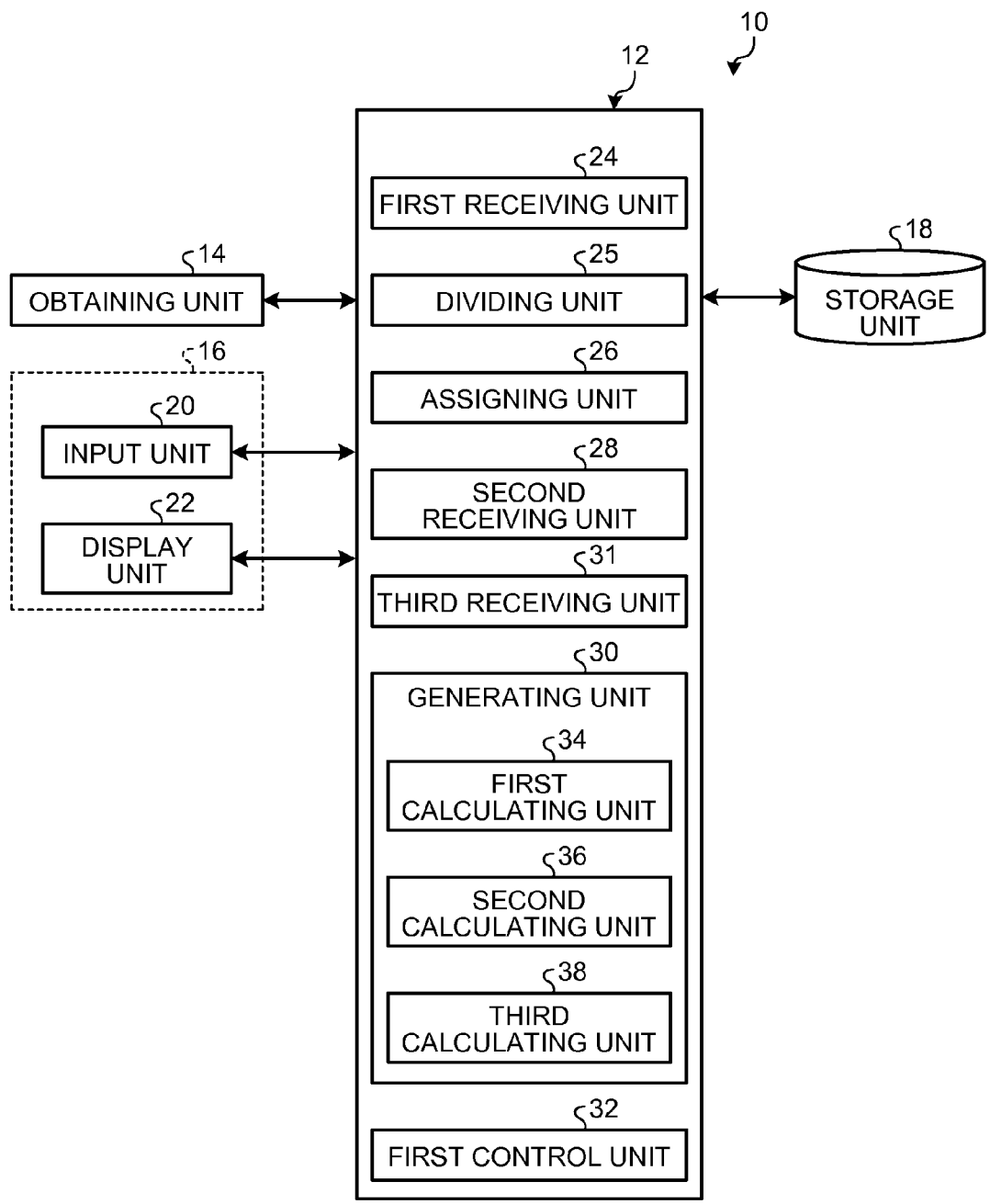
FIG. 1 is a block diagram of an information processing system according to a first embodiment.

FIG. 1 is a block diagram illustrating a functional configuration of an information processing system 10 according to a first embodiment. The information processing system 10 includes an obtaining unit 14, an input unit 20, a display unit 22, an information processing apparatus 12, and a storage unit 18.

In the first embodiment, the explanation is given for a case in which the information processing system 10 includes the information processing apparatus 12, the obtaining unit 14, the input unit 20, the display unit 22, and the storage unit 18 as separate constituent elements. However, alternatively, the information processing system 10 can include the information processing apparatus 12 that is configured in an integrated manner with at least one of the obtaining unit 14, the input unit 20, the display unit 22, and the storage unit 18.

The obtaining unit 14 obtains speech data. Thus, the obtaining unit 14 can be any device that is capable of obtaining speech data. For example, the obtaining unit 14 can be a known microphone.

The speech data contains utterance data of one or more speakers. Herein, a particular piece of utterance data points to the speech data uttered by a particular speaker, and is chronologically continuous in nature until separated by the speech data of another speaker.

The input unit 20 receives input of various instructions from the user. The input unit 20 can be configured, for example, by combining one or more of a mouse, buttons, a remote control, a keyboard, a voice recognition device such as a microphone, and an image recognition device.

The display unit 22 is a device for displaying various images. Herein, a known display device such as a liquid crystal display device is used as the display unit 22.

Meanwhile, it is also possible to configure the input unit 20 in an integrated manner with the display unit 22. More particularly, the input unit 20 and the display unit 22 can be configured in an integrated manner as a user interface (UI) unit 16 that is equipped with the input function as well as the display function. The UI unit 16 can be, for example, a liquid crystal display (LCD) having a touch-sensitive panel.

The storage unit 18 is a memory medium such as a hard disk drive (HDD). The storage unit 18 is used to store a variety of data such as speech data, first data, and operation history information.

FIG. 2 is a schematic diagram illustrating an exemplary data structure of the first data. Herein, the first data represents a table in which utterance identification information (hereinafter, referred to as "utterance IDs"), start timings and end timings, and speaker identification information (hereinafter, referred to as "speaker IDs") are held in a corresponding manner. The first data is created by the information processing apparatus 12 (described later in detail).

The utterance IDs represent the information that enables unique identification of the pieces of utterance data which are included in speech data. Moreover, the utterance IDs indicate the chronological sequence of the pieces of utterance data included in speech data. In the first embodiment, the explanation is given for a case in which the information processing apparatus 12 assigns, as utterance IDs, numbers in ascending order starting from the leading piece of utterance data in the speech data toward the last piece of utterance data in the speech data. The start timings and the end timings indicate the positions of the respective pieces of utterance data in the speech data. The speaker IDs represent the information that enables unique identification of the speakers. Herein, the utterance IDs and the speaker IDs are assigned by the information processing apparatus 12 (described later in detail).

The operation history information indicates the history of giving speaker names to the utterance data by the user. Every time the user gives a speaker name to a piece of utterance data, the information processing apparatus 12 updates the operation history information.

FIG. 3 is a schematic diagram illustrating an exemplary data structure of the operation history information. As illustrated in FIG. 3, more particularly, the operation history information represents a table in which the utterance IDs, the speaker IDs, and the speaker names are held in a corresponding manner. In the operation history information, the utterance IDs and the speaker IDs represent the information assigned by the information processing apparatus (described later); while the speaker names represent the information that is set by the user to the pieces of utterance data as the information indicating the speakers corresponding to the pieces of utterance data.

In the exemplary operation history information illustrated in FIG. 3, the user has given a speaker name to each of utterance IDs "1" to "4" that are chronologically continuous in nature.

Returning to the explanation with reference to FIG. 1, the information processing apparatus 12 supports the user in giving the speaker names.

Figure 4:
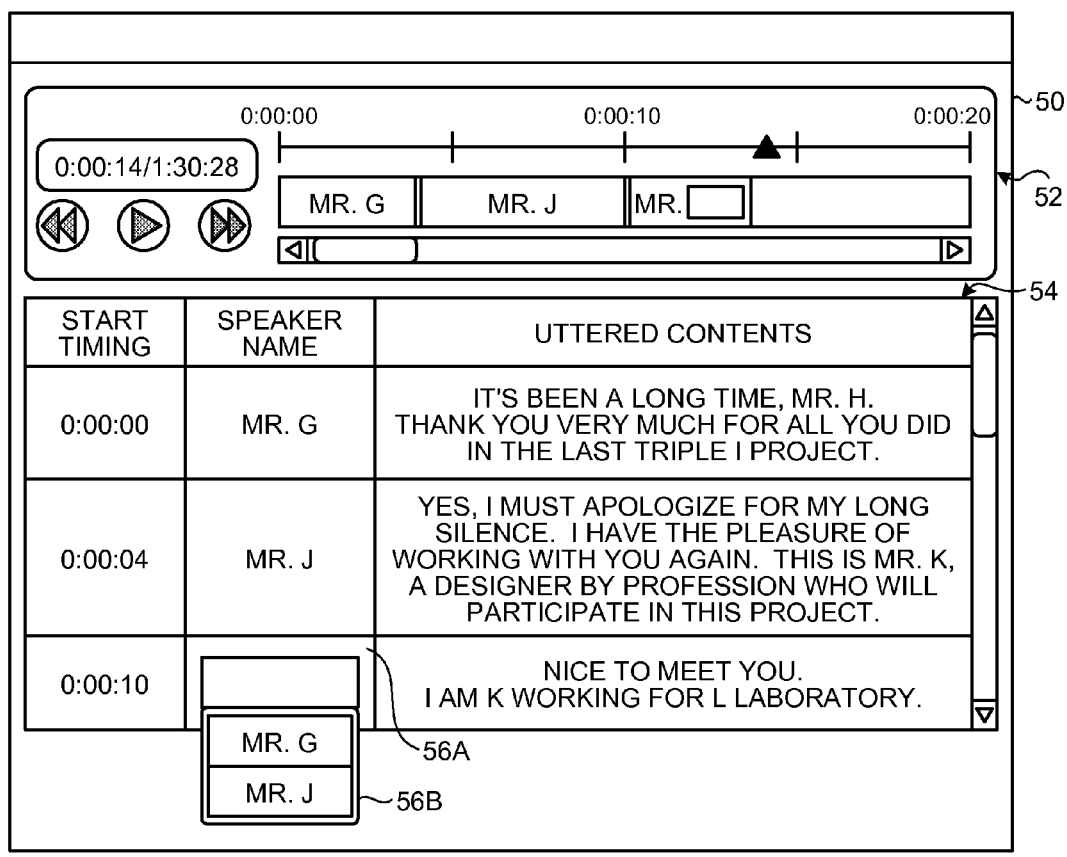
FIG. 4 is schematic diagram illustrating an exemplary input screen.

As for the brief overview, for example, the information processing apparatus 12 displays an input screen on the display unit 22 so as to enable giving a speaker name to each piece of utterance data included in the speech data. FIG. 4 is schematic diagram illustrating an example of the input screen that is used by the user to give the speaker names.

As illustrated in FIG. 4, for example, an input screen 50 includes a reproducing screen 52 and a setting screen 54. The reproducing screen 52 includes a reproduction state of the speech data and includes the speaker names that have already been set to the pieces of utterance data included in the speech data. The setting screen 54 includes a list of pieces of utterance data that are included in the speech data; includes an entry field for entering speaker names; and includes an entry field for entering uttered contents. If a speaker name is already given by the user, then that speaker name is displayed in the entry field for entering speaker names. If any uttered contents are already set by the user or are retrieved as text data from the utterance data, then those uttered contents are displayed in the entry field for entering uttered contents. Meanwhile, in FIG. 4, an item "start timing" indicates the start timing of each piece of utterance data included in the speech data.

The user operates the input unit 20 and selects a piece of utterance data to which a speaker name is to be given (in FIG. 4, for example, selects the start timing "0:00:10"). Then, the user inputs a speaker name in an entry field 56A that is the entry field for entering speaker names. At that time, in the information processing apparatus 12 according to the first embodiment, a candidate list 56B containing the candidate speaker names is displayed to enable the user to select a speaker name. With that, the information processing apparatus 12 according to the first embodiment supports the user in giving the speaker name. According to the first embodiment, the information processing apparatus 12 generates a peculiar candidate list. The detailed explanation is given below.

Returning to the explanation with reference to FIG. 1, the information processing apparatus 12 has the hardware configuration of a commonly-used computer in which a central processing unit (CPU), a read only memory (ROM), a random access memory (RAM), and an HDD are connected to each other via a bus.

The information processing apparatus 12 includes a first receiving unit 24, a dividing unit 25, an assigning unit 26, a second receiving unit 28, a third receiving unit 31, a generating unit 30, and a first control unit 32.

The first receiving unit 24 receives speech data from the obtaining unit 14. In the first embodiment, although the explanation is given for a case in which the first receiving unit 24 receives speech data from the obtaining unit 14, it is not the only possible case of receiving speech data. Alternatively, for example, the first receiving unit 24 can receive speech data from an external device or an external memory medium via a communicating unit (not illustrated). Then, the first receiving unit 24 stores the speech data in the storage unit 18. Herein, the speech data can also be stored in advance in the storage unit 18.

The dividing unit 25 divides the speech data, which is received by the first receiving unit 24, into a plurality of pieces of utterance data. For example, the dividing unit 25 analyzes the speech data in sequence from the start; identifies a range in which speech data belonging to a predetermined range of acoustic features is present in a continuous manner as a single piece of utterance data; and accordingly divides the speech data into a plurality of pieces of utterance data. Herein, the acoustic features are identified using a known technology.

The assigning unit 26 assigns a speaker ID to each piece of utterance data, which is obtained by the dividing unit 25 by dividing the speech data, based on the corresponding acoustic features. More particularly, the assigning unit 26 classifies the pieces of utterance data, which are obtained by the dividing unit 25 by dividing the speech data, into groups each belonging to a predetermined range of acoustic features. Then, to each such group, the assigning unit 26 assigns a speaker ID that represents unique identification information of that group. With that, the assigning unit 26 generates the first data mentioned above, and then stores the first data in the storage unit 18. Meanwhile, such acoustic-feature-based classification is performed by combining one or more of a known acoustic feature quantity extraction technology, a known voice/non-voice determination technology, a known speaker classification technology, a known voice recognition technology, and a known linguistic processing technology.

The first control unit 32 performs control to display various screens such as input screens on the display unit 22.

The second receiving unit 28 receives, from the user, instruction information that indicates the piece of utterance data to which a speaker name is to be given from among a plurality of pieces of utterance data that are included in the speech data. The instruction information contains, for example, the utterance ID of the utterance data to which a speaker name is to be given. More specifically, the user operates the input unit 20 and, from among a plurality of pieces of utterance data that are included in the speech data, specifies the piece of utterance data to which a speaker name is to be given. As a result, the input unit 20 sends the information indicating the specified utterance data to the second receiving unit 28. That is, the second receiving unit 28 receives the information indicating the specified utterance data from the input unit 20, and obtains the instruction information indicating the utterance data to which a speaker name is to be given.

More particularly, the first control unit 32 displays a list of pieces of utterance data, which are included in the speech data, on the display unit 22. As long as the list of pieces of utterance data indicates the information enabling identification of utterance data, it serves the purpose. For example, the list of pieces of utterance data can contain the position (the start timing or the end timing) of each piece of utterance data in the speech data. Then, on the display unit 22, the first control unit 32 displays a message that prompts the user to specify the utterance data to which a speaker name is to be given from the list of pieces of utterance data that is displayed. When the user operates the input unit 20 and selects the utterance data to which a speaker name is to be given, the input unit 20 sends the instruction information, which contains the utterance ID of the utterance data to which a speaker name is to be given, to the second receiving unit 28.

Meanwhile, as the instruction information indicating the utterance data to which a speaker name is to be given, it is also possible to use information other than an utterance ID. For example, the instruction information can indicate the position (the timing) of the user-selected utterance data in the speech data. In that case, from the first data, the second receiving unit 28 obtains the utterance ID of the utterance data corresponding to the timing specified in the instruction information as the utterance ID of the utterance data to which a speaker name is to be given.

Meanwhile, without the first control unit 32 displaying a list of pieces of utterance data, the second receiving unit 28 can receive the utterance data to which a speaker name is to be given from the user. In that case, the first control unit 32 displays a message that prompts the user to specify the utterance data to which a speaker name is to be given. Then, the user can operate the input unit 20 and input instruction information indicating the utterance data to which a speaker name is to be given.

When the second receiving unit 28 receives the instruction information indicating the utterance data to which a speaker name is to be given, the generating unit 30 generates a candidate list based on the operation history information. The candidate list contains the candidate speaker names from which the user can select a speaker name to be given to the utterance data that is identified by the utterance ID specified in the instruction information which is received by the second receiving unit 28.

In the first embodiment, the generating unit 30 generates a candidate list that indicates the correspondence between the candidate speaker names and the probability at which each speaker name specified in the operation history information is given to the utterance data that is identified by the instruction information.

Regarding the probability at which each candidate speaker name is given to the utterance data to which a speaker name is to be given; numbers are used in such a way that, for example, higher the probability, higher is the priority indicated by the corresponding number.

Meanwhile, the generating unit 30 includes a first calculating unit 34, a second calculating unit 36, and a third calculating unit 38.

The first calculating unit 34 calculates first probabilities based on the operation history information. Herein, the first probabilities indicate, from the correspondence relationship between speaker IDs and speaker names specified in the operation history information, the probabilities at which the speaker names are associated with the speaker IDs. In other words, for each speaker ID specified in the operation history information, the first probability indicates the probability at which the utterance data identified by the utterance ID corresponding to that speaker ID is given the speaker name corresponding to that speaker ID by the user. More particularly, from the operation history information, the first calculating unit 34 reads the correspondence relationship between the speaker IDs and the speaker names. Then, with respect to each speaker ID that has been read, the first calculating unit 34 calculates the first probability at which the corresponding speaker name is given.

Herein, assume that the operation history information is in the state illustrated in FIG. 3. In that case, a speaker ID "A" every time has a speaker name "presenter" corresponding thereto; a speaker ID "B" has a speaker name "journalist" corresponding thereto; and a speaker ID "C" has a speaker name "leading performer" corresponding thereto. FIG. 5 is an explanatory diagram for explaining the first probabilities. Assume that the operation history information is in the state illustrated in FIG. 3. Then, with respect to the piece of utterance data having the utterance ID "1" and the piece of utterance data having the utterance ID "4" that correspond to the speaker ID "A"; the first calculating unit 34 calculates "1.0" as the first probability that indicates the probability at which the user has given the speaker name "presenter". Similarly, with respect to the utterance data having the utterance ID "2" corresponding to the speaker ID "B", the first calculating unit 34 calculates "1.0" as the first probability that indicates the probability at which the user has given the speaker name "journalist". Moreover, with respect to the utterance data having the utterance ID "3" corresponding to the speaker ID "C", the first calculating unit 34 calculates "1.0" as the first probability that indicates the probability at which the user has given the speaker name "leading performer".

Meanwhile, for example, assume that the operation history information contains the history indicating that "presenter" is the speaker name corresponding to the speaker ID "A" as well as contains the history indicating that "journalist" is the speaker name corresponding to the speaker ID "A". In this case, with respect to the utterance data having the utterance ID corresponding to the speaker ID "A", the first calculating unit 34 calculates "0.5" as the first probability that indicates the probability at which the user has given the speaker name "presenter". Similarly, with respect to the utterance data having the utterance ID corresponding to the speaker ID "A", the first calculating unit 34 calculates "0.5" as the first probability that indicates the probability at which the user has given the speaker name "journalist".

Returning to the explanation with reference to FIG. 1, the second calculating unit 36 calculates second probabilities. Herein, a second probability indicates the probability at which each speaker name specified in the operation history information is given subsequent to the speaker name that corresponds to chronologically previous piece of utterance data.

Assume that the operation history information is in the state illustrated in FIG. 3. FIG. 6 is an explanatory diagram for explaining the second probabilities. When the operation history information is in the state illustrated in FIG. 3, the utterance ID "2" has the speaker name "journalist" corresponding thereto. Moreover, the utterance ID "1", which points to the previous piece of utterance data to the utterance data having the utterance ID "2", has the speaker name "presenter" corresponding thereto. Furthermore, in the operation history information, only the utterance ID "2" is set as the utterance ID corresponding to the speaker name "journalist". For that reason, the second calculating unit 36 calculates "1.0" as the second probability that indicates the probability at which "presenter" is given as the speaker name to the previous piece of utterance data to the utterance data that is identified by the utterance ID corresponding to the speaker name "journalist" (i.e., in FIG. 6, the utterance data in "subsequent" section).

That is, as illustrated in FIG. 6, regarding the speaker name "presenter" that is specified in "previous" section and that corresponds to the speaker name "journalist" specified in "subsequent" section, the second probability becomes "1.0".

Moreover, the second calculating unit 36 calculates "0" as the second probabilities that indicates the probabilities at which "journalist" and "leading performer" are given as the speaker names to the previous piece of utterance data to the utterance data identified by the utterance ID corresponding to the speaker name "journalist" (i.e., in FIG. 6, utterance data in "subsequent" section).

As illustrated in FIG. 6, regarding the speaker names "journalist" and "leading performer" that are specified in "previous" section and that correspond to the speaker name "journalist" specified in "subsequent" section, the second probabilities become "0".

In an identical manner, regarding each speaker name (such as "presenter", "journalist", and "leading performer") that is specified in the operation history information, the second calculating unit 36 calculates the second probability (see FIG. 6).

Meanwhile, in FIG. 6, "<new>" indicates a case in which, as against the speaker name given to the previous piece of utterance data, the speaker name given to the next piece of utterance data is a new speaker name that is different than the already-given speaker names which are specified in the operation history information. Regarding "<new>" too, the second calculating unit 36 calculates the second probability in an identical manner.

In the first embodiment, the explanation is given for a case in which the first calculating unit 34 and the second calculating unit 36 respectively calculate the first probabilities and the second probabilities by referring to all of the information specified in the operation history information. However, that is not the only possible case.

For example, with respect to the utterance data that is received by the second receiving unit 28 as the utterance data to which a speaker name is to be given, the first calculating unit 34 and the second calculating unit 36 can respectively calculate the first probabilities and the second probabilities by referring to the operation history information of a predetermined number of pieces of utterance data that are chronologically earlier in the speech data. Alternatively, with respect to the utterance data that is received by the second receiving unit 28 as the utterance data to which a speaker name is to be given, the first calculating unit 34 and the second calculating unit 36 can respectively calculate the first probabilities and the second probabilities by referring to the operation history information of the utterance IDs of a predetermined number of pieces of utterance data that are in chronological sequence before and after the utterance data to which a speaker name is to be given.

Returning to the explanation with reference to FIG. 1, the third calculating unit 38 calculates a score for each speaker name specified in the operation history information. Herein, a score indicates the likelihood at which the corresponding speaker name that is specified in the operation history information is given by the user to the utterance data to which a speaker name is to be given as indicated by the instruction information. Thus, a speaker name having a higher score is more likely to be given to the utterance data to which a speaker name is to be given.

The third calculating unit 38 calculates the scores based on the following information: the instruction information that is received by the second receiving unit 28 and that indicates the utterance data to which a speaker name is to be given; the first probabilities calculated by the first calculating unit 34; and the second probabilities calculated by the second calculating unit 36.

More particularly, from the first data, the third calculating unit 38 the speaker ID corresponding to the utterance data that is received by the second receiving unit 28 as the utterance data to which a speaker name is to be given. Then, from among the first probabilities calculated by the first calculating unit 34, the third calculating unit 38 reads the speaker name and the first probability corresponding to the speaker ID that corresponds to the utterance ID which has been read.

Herein, it is assumed that, for each speaker ID, the first calculating unit 34 calculates the first probability as illustrated in FIG. 5. Moreover, it is assumed that the utterance ID "5" in the first data illustrated in FIG. 2 is the utterance ID of the utterance data that is received by the second receiving unit 28 as the utterance data to which a speaker name is to be given. In that case, in the first data, "D" represents the speaker ID corresponding to the utterance ID "5". However, in FIG. 5, there is no mention of the first probability corresponding to the utterance ID "5". For that reason, the third calculating unit 38 reads "0" as the first probability corresponding to each of the speaker names "presenter", "journalist", and "leading performer" that correspond to the utterance ID "5".

FIG. 7 is an explanatory diagram for explaining the score calculation performed by the third calculating unit 38. As illustrated in FIG. 7, the third calculating unit 38 reads, as a target for score calculation, the first probability "0" corresponding to each of the speaker names ("presenter", "journalist", and "leading performer") specified in the operation history information. Moreover, the third calculating unit 38 reads, as a target for score calculation, the first probability "1.0" at which a new speaker name is given.

Herein, assume that the second calculating unit 36 calculates the second probabilities illustrated in FIG. 6. Moreover, assume that the utterance data that is received by the second receiving unit 28 as the utterance data to which a speaker name is to be given has the utterance ID "5". In this case, from the operation history information, the third calculating unit 38 reads the speaker name corresponding to the utterance ID "4" of the previous piece of utterance data. When the operation history information is in the state illustrated in FIG. 3, the third calculating unit 38 reads the speaker name "presenter" corresponding to the utterance ID "4". Then, in the case when the previous piece of utterance data has the speaker name "presenter"; the third calculating unit 38 reads, as targets for score calculation, the second probabilities that are set subsequently to the speaker names specified in the operation history information from among the second probabilities calculated by the second calculating unit 36.

More particularly, in the case when the previous piece of utterance data has the speaker name "presenter"; the third calculating unit 38 reads, as targets for score calculation from among the second probabilities illustrated in FIG. 6, the second probabilities of "0", "1.0", "0", and "1.0" that are set subsequently to the speaker names ("presenter", "journalist", "leading performer", and a new speaker name "<new>", respectively) specified in the operation history information (see FIG. 7).

Then, as the score corresponding to each speaker name, the third calculating unit 38 calculates the added value of the first probability and the second probability corresponding to that speaker name (see FIG. 7).

Although, as the score corresponding to each speaker name, the third calculating unit 38 calculates the added value of the first probability and the second probability, that is not the only possible case. Alternatively, for example, as the score corresponding to each speaker name, the third calculating unit 38 can calculate a value obtained by firstly multiplying the first probability and the second portability corresponding to that speaker name with a predetermined weight coefficient and then adding the first probability and the second probability.

Besides, to the added value of the first probability and the second probability, the third calculating unit 38 can further add higher values in descending order of usage frequency of the speaker names or can add higher values in ascending order of periods in which no speaker name is set, and calculate the added value as the score.

Returning to the explanation with reference to FIG. 1, the generating unit 30 selects a predetermined number of speaker names in descending order of the scores calculated by the third calculating unit 38, and generates a candidate list in which the selected speaker names are listed as candidate speaker names. Herein, the predetermined number can be equal to or greater than one. For example, the generating unit 30 can set in advance two or three as the predetermined number.

Herein, for example, assume that the third calculating unit 38 calculates the scores illustrated in FIG. 7 as the scores of the speaker names that have already been given by the user. In this case, the generating unit 30 reads, for example, two speaker names ("<new>" and "journalist") in descending order of the scores. Then, the generating unit 30 generates a candidate list in which the selected speaker names are listed as candidate speaker names.

Alternatively, the generating unit 30 can generate a candidate list in which the speaker names reordered according to descending order of the scores, which are calculated by the third calculating unit 38, serve as the candidate speaker names. FIG. 8 is a schematic diagram illustrating an exemplary data structure of the candidate list. Assume that the third calculating unit 38 calculates the scores illustrated in FIG. 7 as the scores of the speaker names that have already been given by the user. In this case, the generating unit 30 assigns priority in descending order of scores illustrated in FIG. 7. Then, as illustrated in FIG. 8, the generating unit 30 generates a candidate list in which the speaker names are reordered in descending order of priority.

Returning to the explanation with reference to FIG. 1, the first control unit 32 performs control so as to display the candidate list, which is generated by the generating unit 30, in an entry field for entering the speaker name that corresponds to the utterance data identified by the utterance ID which is specified in the instruction information of the utterance data that is received by the second receiving unit 28 as the utterance data to which a speaker name is to be given.

Figure 9:
FIG. 9 is a schematic diagram illustrating an exemplary setting screen.

FIG. 9 is a schematic diagram illustrating an example of a setting screen 54A that is displayed on the input screen used in giving speaker names. In the example illustrated in FIG. 9, a setting screen is illustrated in which speaker names have already been given to the pieces of utterance data having the start timings "0:00:00", "0:00:05", "0:00:11", and "0:00:18" in the speech data. Moreover, in the example illustrated in FIG. 9, a case is illustrated in which the utterance data having the start timing "0:00:20" is specified by the user as the utterance data to which a speaker name is to be given. Herein, it is assumed that the utterance data having the start timing "0:00:20" is same as the utterance data having the utterance ID "5" in the first data illustrated in FIG. 2.

Assume that the operation history information is in the state illustrated in FIG. 3. In this case, as described above, the generating unit 30 generates the candidate list illustrated in FIG. 8. Hence, as illustrated in FIG. 9, the first control unit 32 displays a candidate list 58B in an entry field 58A, which is used to enter the speaker name of the utterance data that is specified by the user by operating the input unit 20 as the utterance data to which a speaker name is to be given (i.e., the utterance data having the start timing "0:00:20"), in the setting screen 54A. Meanwhile, the first control unit 32 can display the candidate list 58B when a pointer T displayed on the display unit 22 is positioned on the entry field 58A as a result of a user operation of the input unit 20.

Returning to the explanation with reference to FIG. 1, the third receiving unit 31 receives, from the input unit 20, the speaker name given by the user to the utterance data to which a speaker name is to be given. Herein, the user operates the input unit 20 and selects a speaker name from the candidate list (in FIG. 9, from the candidate list 58B). In the case when the speaker name "<new>" is selected, the input unit 20 receives the input of the speaker name. Then, the input unit 20 sends the speaker name that is either input or selected by the user to the third receiving unit 31. Thus, by receiving the speaker name input by the user from the input unit 20, the third receiving unit 31 receives from the user the speaker name corresponding to the utterance data to which a speaker name is to be given.

FIG. 10 is a schematic diagram illustrating an example of a setting screen 54B. Herein, it is assumed that, in the setting screen 54A illustrated in FIG. 9, the speaker name "journalist" is selected from the candidate list 58B as a result of a user operation of the input unit 20. In this case, as illustrated in FIG. 10, the first control unit 32 displays "journalist" as the speaker name corresponding to the utterance data having the start timing "0:00:20".

Once the third receiving unit 31 receives "journalist" as the speaker name corresponding to the utterance data having the start timing "0:00:20", it stores the speaker name "journalist" in the storage unit 18 as the speaker name corresponding to the utterance ID of the utterance data having the start timing "0:00:20". As a result, the operation history information gets updated. FIG. 11 is a schematic diagram of an exemplary data structure of the updated operation history information. For example, the third receiving unit 31 updates the operation history information that was in the state illustrated in FIG. 3 to the operation history information illustrated in FIG. 11.

With reference to the example illustrated in FIG. 9, the explanation is given for a case in which, in the entry field 58A for entering speaker names, an entry field for text input is placed as the topmost field and the candidate list 58B having the speaker names arranged according to the priority is displayed below the entry field for text input. Moreover, in the example illustrated in FIG. 9, the speaker name "<new>" is not included in the candidate list 58B. As a result, it becomes possible for the user to give the speaker name either by operating the input unit 20 and directly inputting the speaker name in the entry field for text input or by selecting one of the speaker names displayed in the candidate list 58B.

Figure 13:
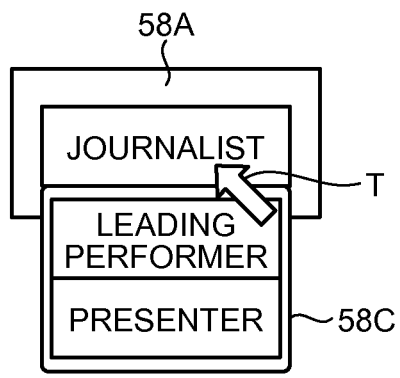
FIG. 13 is a schematic diagram illustrating a display form of the candidate list.

FIG. 12 is a schematic diagram illustrating an example of the candidate list. FIG. 13 is a schematic diagram illustrating a display form of the candidate list. Herein, assume that the generating unit 30 generates the candidate list illustrated in FIG. 12. In that case, if the display form is such that the speaker name "<new>" is not to be included in a candidate list 58C, then the first control unit 32 can display the candidate list 58C as illustrated in FIG. 13.

However, the display form of the candidate list 58B is not limited to the display form illustrated in FIG. 9. Alternatively, for example, in the case when "<new>" is the speaker name corresponding to the priority "1", the first control unit 32 can place the entry field for text input as the topmost field.

Figure 14:
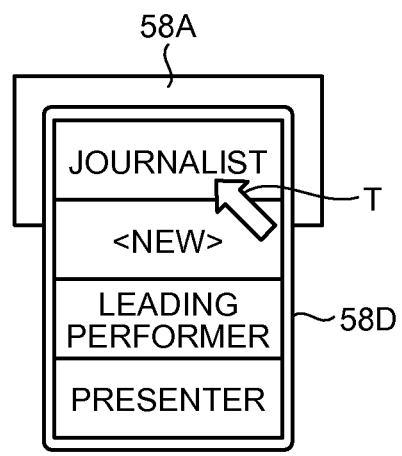
FIG. 14 is a schematic diagram illustrating a display form of the candidate list.

FIG. 14 is a schematic diagram illustrating a display form of the candidate list. For example, assume that the generating unit 30 generates the candidate list illustrated in FIG. 12. In that case, the first control unit 32 can display a candidate list 58D in which the speaker name "<new>" is also included in the order of priority specified in the candidate list (see FIG. 14).

Given below is the explanation about a sequence of operations performed during the information processing in the information processing apparatus 12.

Figure 15:
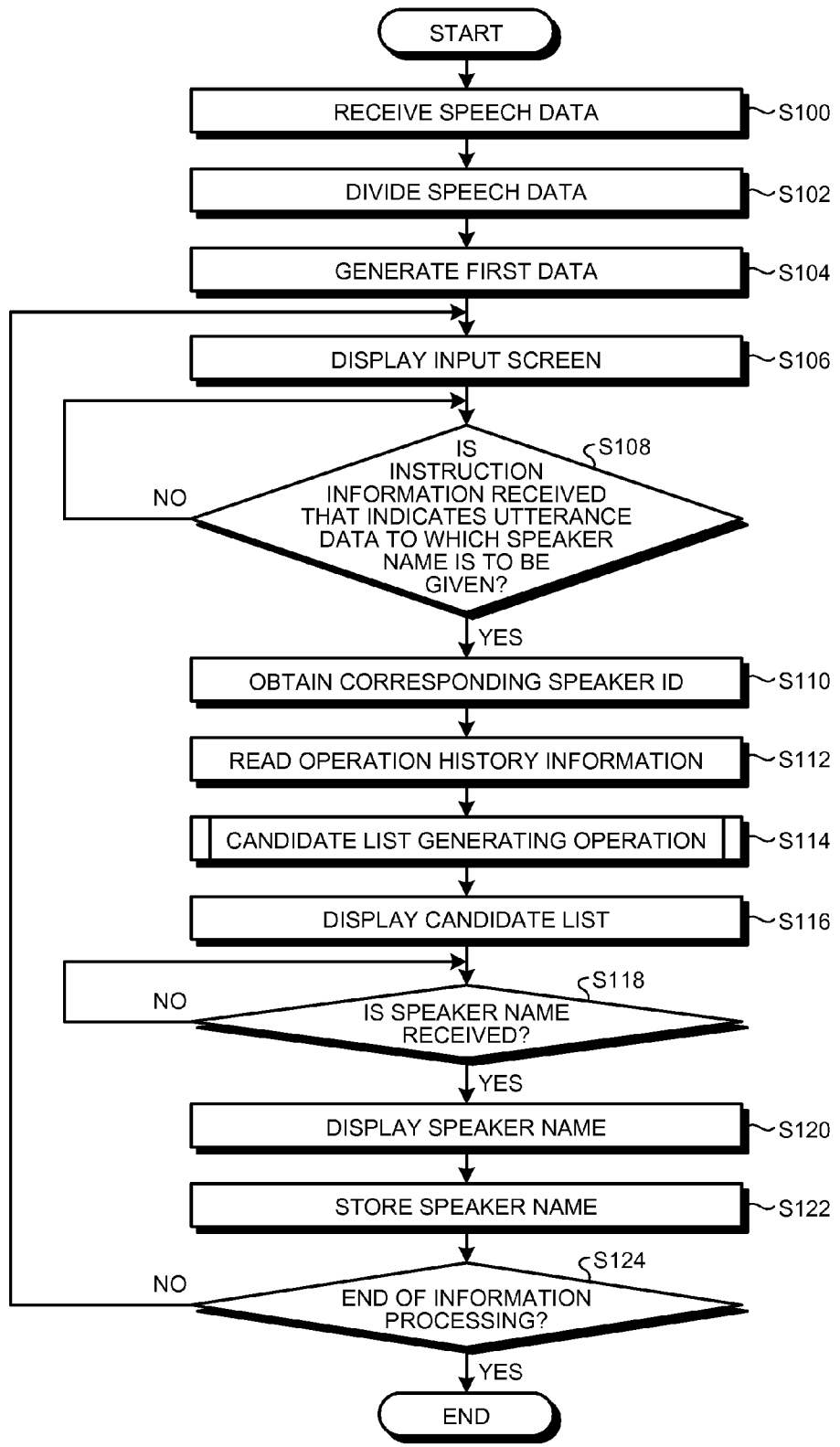
FIG. 15 is a flowchart illustrating a sequence of operations performed according to the first embodiment.

FIG. 15 is a flowchart illustrating a sequence of operations performed during the information processing in the information processing apparatus 12.

Firstly, the first receiving unit 24 receives speech data from the obtaining unit 14 (Step S100). Then, the dividing unit 25 divides the speech data, which is received by the first receiving unit 24 at Step S100, into a plurality of pieces of utterance data (Step S102).

Subsequently, the assigning data 26 generates the first data (Step S104). That is, at Step S104, the assigning unit 26 assigns, to each piece of utterance ID that is obtained by the dividing unit 25 by dividing the speech data at Step S102, an utterance ID which represents unique identification information of that piece of utterance data and which indicates the chronological sequence of that piece of utterance data in the speech data. Moreover, the assigning unit 26 assigns a speaker ID to each piece of utterance data. In this way, the assigning generates the first data and stores it in the storage unit 18.

Then, the first control unit 32 performs control to display an input screen on the display unit 22 to enable selection of a piece of utterance data to which a speaker name is to be given from among a plurality of pieces of utterance data that are included in the speech data received at Step S100 (Step S106).

Figure 16:
FIG. 16 is a schematic diagram illustrating an exemplary input screen.

FIG. 16 is a schematic diagram illustrating an example of the input screen. For example, the first control unit 32 performs control to display on the display unit 22 an input screen that includes a setting screen 54C illustrated in FIG. 16. More specifically, the first control unit 32 reads the first data generated at Step S104 and reads the operation history information stored in the storage unit 18. Then, the first control unit 32 displays the setting screen 54C that includes a list of information for enabling identification of the pieces of utterance data included in the speech data received at Step S100, that includes an entry field for entering speaker names, and that includes an entry field for entering uttered contents. In the example illustrated in FIG. 16, the start timings "0:00:00", "0:00:05", "0:00:11", "0:00:18", and "0:00:20" of the pieces of utterance data in the speech data are displayed as the list of information that enables identification of the pieces of utterance data. Herein, the pieces of utterance data having the start timings "0:00:00", "0:00:05", "0:00:11", and "0:00:18" have speaker names already given thereto. Moreover, the pieces of utterance data having the start timings "0:00:00", "0:00:05", "0:00:11", "0:00:18", and "0:00:20" have the uttered contents already set therein.

Returning to the explanation with reference to FIG. 15, subsequently, the second receiving unit 28 determines whether or not instruction information indicating the utterance data to which a speaker name is to be given is received from the user (Step S108). Until it is determined that the utterance data to which a speaker name is to be given is received from the user (Yes at Step S108), the second receiving unit 28 repeatedly determines that the utterance data to which a speaker name is to be given is not received from the user (No at Step S108). Once it is determined that the utterance data to which a speaker name is to be given is received from the user (Yes at Step S108), the system control proceeds to Step S110.

Then, the generating unit 30 obtains the speaker ID corresponding to the utterance ID that is specified in the instruction information received by the second receiving unit 28 at Step S108 (Step S110); as well as reads the operation history information that is stored in the storage unit 18 (Step S112).

Subsequently, the generating unit 30 performs a candidate list generating operation (Step S114) (described later in detail). As a result of the candidate list generating operation performed at Step S114, a candidate list is generated.

Then, the first control unit 32 performs control to display the candidate list, which is generated as a result of the candidate list generating operation performed at Step S114, in the entry field for entering the speaker name that corresponds to the utterance data which is received from the user at Step S108 as the utterance data to which a speaker name is to be given (Step S116). As a result of the operation performed at Step S116; for example, the candidate list 58B illustrated in FIG. 9 is displayed.

Subsequently, the third receiving unit 31 determines whether or not the speaker name given by the user to the utterance data to which a speaker name is to be given has been received from the input unit 20 (Step S118). Until it is determined that the speaker name given by the user to the utterance data to which a speaker name is to be given has been received from the input unit 20 (Yes at Step S118), the third receiving unit 31 repeatedly determines that the speaker name given by the user to the utterance data to which a speaker name is to be given has not been received from the input unit 20 (No at Step S118). Once it is determined that the speaker name given by the user to the utterance data to which a speaker name is to be given has been received from the input unit 20 (Yes at Step S118), the system control proceeds to Step S120.

Then, the first control unit 32 performs control to display the speaker name received at Step S118 in a speaker name display field for the utterance data that is received at Step S108 as the utterance data to which a speaker name is to be given (Step S120).

Moreover, the third receiving unit 31 stores the speaker name received at Step S118 in the storage unit 18 in a corresponding manner to the utterance ID of the utterance data that is received at Step S108 as the utterance data to which a speaker name is to be given as well as in a corresponding manner to the speaker ID obtained at Step S110 (Step S122). As a result of the operation performed at Step S122, the operation history information stored in the storage unit 18 gets updated every time the user gives a speaker name to a piece of utterance data.

Then, the information processing apparatus 12 determines whether or not to end the information processing (Step S124). The information processing apparatus 12 performs the determination at Step S124 by, for example, determining whether or not a signal indicating the end of information processing is received as a result of an operation of the input unit 20 by the user.

If it is determined not to end the information processing (No at Step S124), then the system control returns to Step S106. On the other hand, if it is determined to end the information processing (Yes at Step S124); then that marks the end of the present routine.

Given below is the explanation of the candidate list generating operation performed at Step S114.

Figure 17:
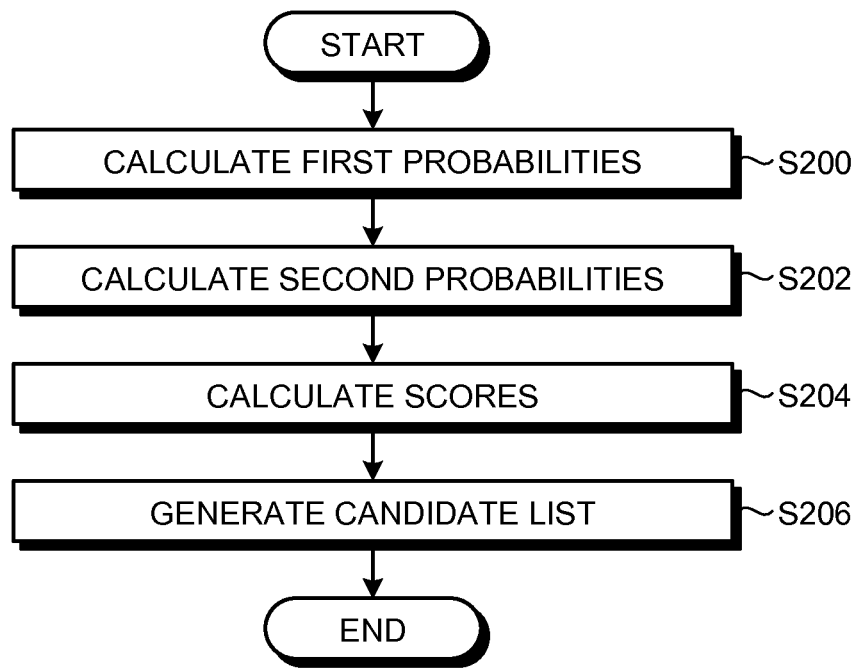
FIG. 17 is a flowchart for explaining a sequence of operations performed during a candidate list generating operation according to the first embodiment.

FIG. 17 is a flowchart for explaining a sequence of operations performed by the generating unit 30 during the candidate list generating operation.

Firstly, the first calculating unit 34 calculates the first probabilities based on the operation history information (Step S200). Then, the second calculating unit 36 calculates the second probabilities (Step S202).

Subsequently, the third calculating unit 38 calculates the scores (Step S204). Then, the generating unit 30 selects a predetermined number of speaker names in descending order of the scores calculated by the third calculating unit 38, and generates a candidate list in which the selected speaker names are listed as candidate speaker names (Step S206). That marks the end of the present routine.

As described above, in the information processing apparatus 12 according to the first embodiment, based on the operation history information, a candidate list is generated that indicates the candidate speaker names which can be given by the user to the utterance data to which a speaker name is to be given. For that reason, in the information processing apparatus 12 according to the first embodiment, it becomes possible to provide information that easily enables giving a speaker name to the utterance data of each of one or more speakers that is included in the speech data.

Moreover, in the information processing apparatus 12 according to the first embodiment, for each speaker name specified in the operation history information, a score is calculated that indicates the likelihood at which that speaker name is given to the utterance data to which a speaker name is to be given. Then, in the information processing apparatus 12, a candidate list is generated in which the speaker names are arranged in descending order of scores.

For that reason, it becomes possible to provide information that easily enables giving a speaker name to the utterance data of each of one or more speakers that is included in the speech data.

Furthermore, in the information processing apparatus 12 according to the first embodiment, the score mentioned above is calculated on the basis of the chronologically previous piece of utterance data to the utterance data to which a speaker name is to be given.

Thus, in the information processing apparatus 12 according to the first embodiment, the candidate list is generated by taking into account the relay of speakers found in the speech data. As a result, the information processing apparatus 12 can be implemented in a particularly suitable manner in the case of assigning speaker names to each piece of utterance data included in the speech data having a straightforward relay of speakers such as in a lecture, an interview, a press conference, or the like.

Moreover, in the information processing apparatus 12 according to the first embodiment, even when the granularity desired by the user is not at an individual level, that is, even when a role or an organization is to be uniformly assigned to a plurality of speakers as the speaker name; a candidate list can be generated according to the granularity. That enables achieving reduction in the user load of altering the speaker names.

Second Embodiment

According to a second embodiment, a candidate list is generated by further referring to the utterance data that is selected by the user.

Figure 18:
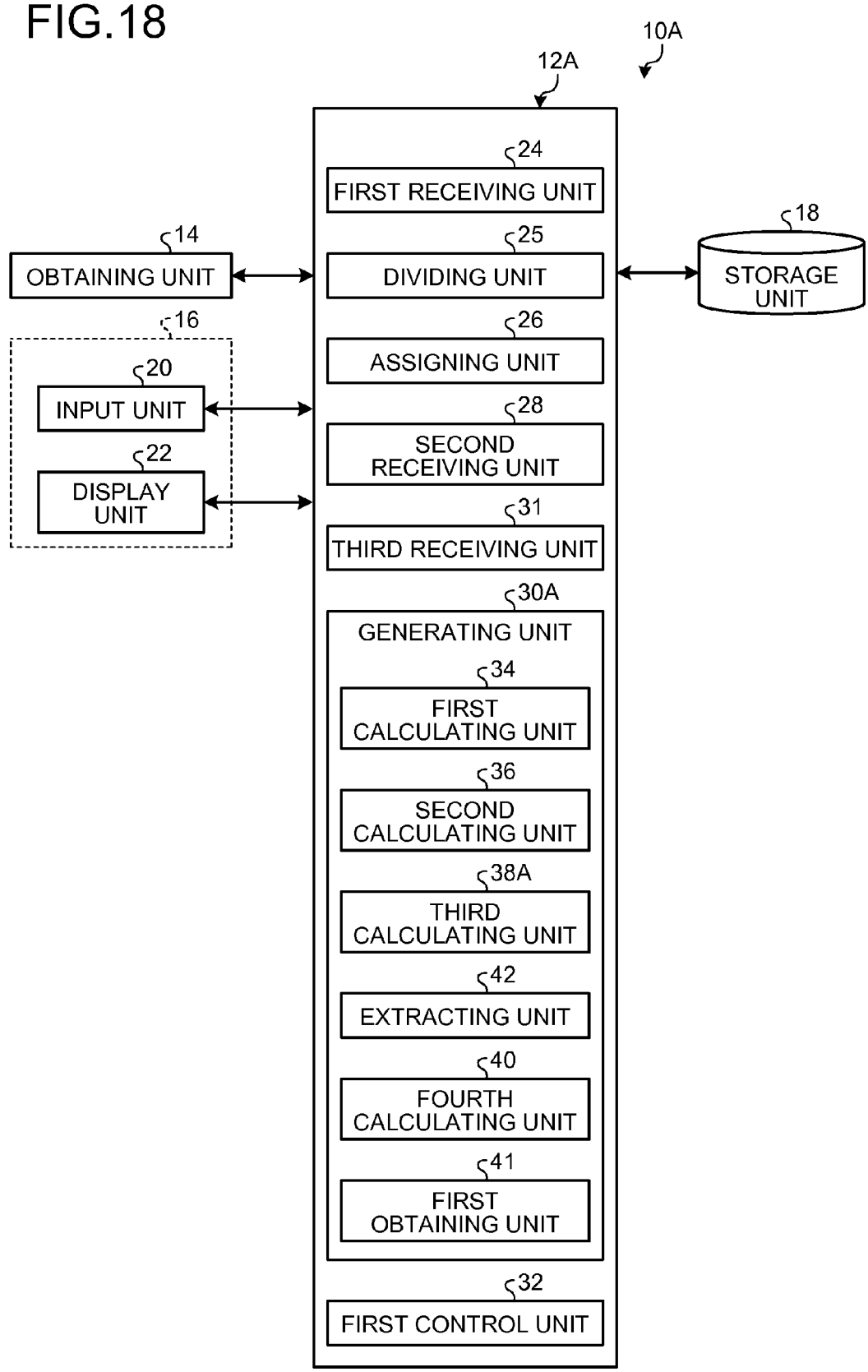
FIG. 18 is a block diagram of an information processing system according to a second embodiment.

FIG. 18 is a block diagram illustrating a functional configuration of an information processing system 10A according to the second embodiment. The information processing system 10A includes the obtaining unit 14, the input unit 20, the display unit 22, an information processing apparatus 12A, and the storage unit 18. Herein, the obtaining unit 14, the input unit 20, the display unit 22, and the storage unit 18 are identical to the description in the first embodiment.

The information processing apparatus 12A includes the first receiving unit 24, the dividing unit 25, the assigning unit 26, the second receiving unit 28, the third receiving unit 31, a generating unit 30A, and the first control unit 32. Herein, the first receiving unit 24, the dividing unit 25, the assigning unit 26, the second receiving unit 28, the third receiving unit 31, and the first control unit 32 are identical to the description in the first embodiment.

The generating unit 30A includes the first calculating unit 34, the second calculating unit 36, a third calculating unit 38A, a fourth calculating unit 40, an extracting unit 42, and a first obtaining unit 41. Herein, the first calculating unit 34 and the second calculating unit 36 are identical to the description in the first embodiment.

The first obtaining unit 41 obtains text data corresponding to each piece of utterance data that is included in the speech data received by the first receiving unit 24. Herein, the first obtaining unit 41 implements a known technology for generating text data from the speech data, and obtains text data corresponding to each piece of utterance data that is obtained by the dividing unit 25 by dividing the speech data.

Alternatively, as the text data corresponding to each piece of utterance data, the first obtaining unit 41 can obtain text data that indicates the uttered contents set by the user for each piece of utterance data which is obtained by the dividing unit 25 by dividing the speech data. Rather, as the text data corresponding to each piece of utterance data, it is desirable that the first obtaining unit 41 obtains text data that indicates the uttered contents set by the user for each piece of utterance data which is obtained by the dividing unit 25 by dividing the speech data.

From among the pieces of text data obtained corresponding to the pieces of utterance data by the first obtaining unit 41, the extracting unit 42 at least reads the text data of the utterance data that is obtained by the second receiving unit 28 as the utterance data to which a speaker name is to be given and reads the text data of the previous piece of utterance data to the utterance data to which a speaker name is to be given.

Alternatively, the extracting unit 42 can read at least either the text data of the utterance data that is obtained by the second receiving unit 28 as the utterance data to which a speaker name is to be given or the text data of the previous piece of utterance data to the utterance data to which a speaker name is to be given. However, from the perspective of enhancing the accuracy of speaker names specified in the candidate list; it is desirable that, from among the pieces of text data obtained corresponding to the pieces of utterance data by the first obtaining unit 41, the extracting unit 42 reads the text data of the utterance data that is obtained by the second receiving unit 28 as the utterance data to which a speaker name is to be given as well as reads the text data of the previous piece of utterance data to the utterance data to which a speaker name is to be given.

Then, the extracting unit 42 analyzes the text data of the utterance data that is obtained by the second receiving unit 28 as the utterance data to which a speaker name is to be given as well as analyzes the text data of the previous piece of utterance data to the utterance data to which a speaker name is to be given; and extracts predetermined speaker identification information included in each piece of text data.

Alternatively, the extracting unit 42 can analyze the utterance data that is obtained by the second receiving unit 28 as the utterance data to which a speaker name is to be given as well as analyze the previous piece of utterance data to the utterance data to which a speaker name is to be given; and can extract speaker identification information included in each piece of utterance data.

The speaker identification information enables identification of the speakers. In the second embodiment, the speaker identification information points to one or more pieces of information that belong to speaker names set by the user and that enable identification of the speakers. In the second embodiment, in the storage unit 18 are further stored the speaker names given by the user in a corresponding manner to one or more pieces of speaker identification information belonging to each speaker name. Herein, the speaker names and the speaker identification information belonging to each speaker name can be set in advance by the user by operating the input unit 20, and can be stored in advance in the storage unit 18. Moreover, the speaker names and the speaker identification information belonging to each speaker name can be modified by operating the input unit 20.

For example, in the storage unit 18, "journalist" is stored in advance as a speaker name. Moreover, for example, as the speaker identification information corresponding to the speaker name "journalist"; "newspaper P", "Q", "newspaper R", and "S" are stored in the storage unit 18. Herein, "Q" indicates the name of an employee of newspaper P; while "S" indicates the name of an employee of newspaper R. In this way, in the second embodiment, in the storage unit 18, the speaker identification information belonging to each speaker name is stored in advance.

Moreover, the speaker identification information belonging to each speaker name can be set in a dynamically associated manner to proper nouns such as person names/organization names that are extracted from the text data corresponding to each piece of utterance data based on the operation history information. For example, in the storage unit 18, "journalist" is stored as the speaker name and "newspaper P" and "Q" are stored as the speaker identification information.

The extracting unit 42 analyzes the text data of the utterance data that is obtained by the second receiving unit 28 as the utterance data to which a speaker name is to be given as well as analyzes the text data of the previous piece of utterance data to the utterance data to which a speaker name is to be given; and extracts predetermined speaker identification information included in each piece of text data.

The fourth calculating unit 40 calculates third probabilities based on the operation history information and based on the speaker identification information that has been extracted. The third probabilities indicate the probabilities at which the speaker identification information belonging to all speaker names specified in the operation history information is included in at least the utterance data to which a speaker name is to be given.

Herein, although the third probabilities indicate the probabilities at which the speaker identification information belonging to all speaker names specified in the operation history information is included in at least the utterance data to which a speaker name is to be given, it is desirable that the third probabilities indicate the probabilities at which the speaker identification information belonging to all speaker names specified in the operation history information is not only included in the utterance data to which a speaker name is to be given but also included in the previous piece of utterance data to the utterance data to which a speaker name is to be given.

FIG. 19 is an explanatory diagram for explaining the third probabilities. For example, it is assumed that the utterance data that is received by the second receiving unit 28 as the utterance data to which a speaker name is to be given is same as the utterance data having the start timing "0:00:20" as illustrated in FIG. 16. Moreover, it is assumed that the user has operated the input unit 20 and has set the text data "I am S working for newspaper R. Director U is known to be strict regarding acting. How was the experience to work under director U?" as the uttered contents for the utterance data to which a speaker name is to be given. Furthermore, it is assumed that "Who's next? Pleas raise your hand. Yes, that journalist over there, go ahead with your question." is the text data of the previous piece of utterance data to the utterance data to which a speaker name is to be given.

In this case, the extracting unit 42 extracts "newspaper R" and "S" as the preregistered speaker identification information from the pieces of text data. Then, regarding each speaker name specified in the operation history information, the fourth calculating unit 40 calculates the third probability that indicates the probability at which the speaker identification information belonging to that speaker name is extracted by the extracting unit 42. In this case, as the third probability corresponding to the speaker name "journalist", the fourth calculating unit 40 calculates "1.0" as the third probability for "newspaper R" and "S" that are extracted by the extracting unit 42 as the speaker identification information belonging to the speaker name "journalist". In contrast, if the speaker identification information belonging to the speaker names "presenter" and "leading performer" is not extracted from the text data read by the extracting unit 42, then the fourth calculating unit 40 calculates "0" as the third probability corresponding to each of the speaker names "presenter" and "leading performer".

Returning to the explanation with reference to FIG. 18, the third calculating unit 38A calculates scores. In the second embodiment, the third calculating unit 38A calculates the scores based on the first probabilities calculated by the first calculating unit 34, the second probabilities calculated by the second calculating unit 36, and the third probabilities calculated by the fourth calculating unit 40.

FIG. 20 is an explanatory diagram for explaining the score calculation performed by the third calculating unit 38A. Herein, in an identical manner to the third calculating unit 38 according to the first embodiment, the third calculating unit 38A reads the first probability and the second probability corresponding to each speaker name specified in the operation history information. Moreover, the third calculating unit 38A reads the third probability calculated by the fourth calculating unit 40 regarding each speaker name specified in the operation history information. Then, as the score corresponding to each speaker name, the third calculating unit 38A calculates the added value of the first probability, the second probability, and the third probability corresponding to that speaker name (see FIG. 20). Alternatively, in an identical manner to the first embodiment, as the score corresponding to each speaker name, the third calculating unit 38A can calculate a value obtained by firstly multiplying the first probability, the second portability, and the third probability with a predetermined weight coefficient; and then adding the first probability, the second probability, and the third probability.

Returning to the explanation with reference to FIG. 18, the generating unit 30A selects a predetermined number of speaker names in descending order of the scores calculated by the third calculating unit 38A, and generates a candidate list in which the selected speaker names are listed as candidate speaker names.

Given below is the explanation about a sequence of operations performed during the information processing in the information processing apparatus 12A.

Figure 21:
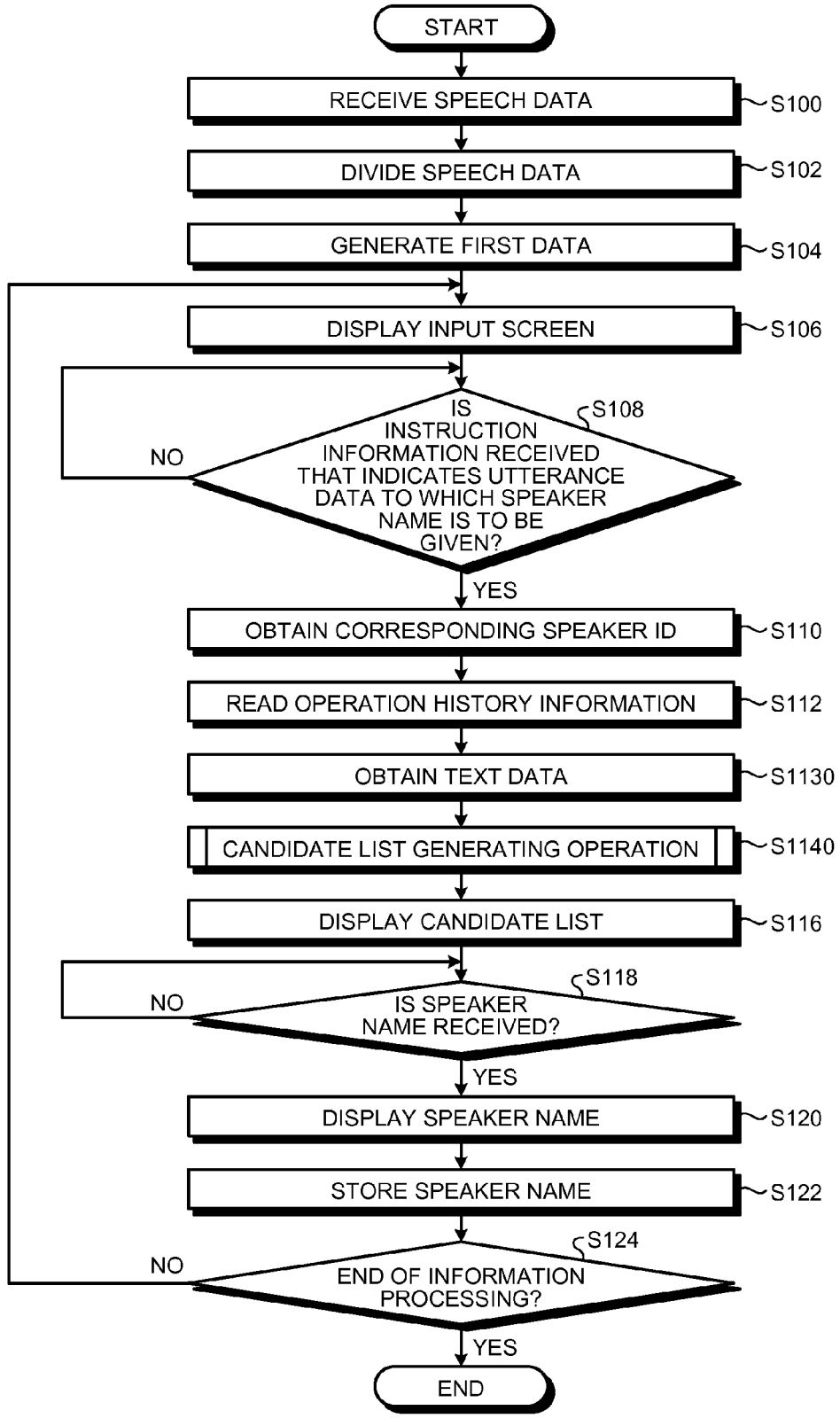
FIG. 21 is a flowchart illustrating a sequence of operations performed according to the second embodiment.

FIG. 21 is a flowchart illustrating a sequence of operations performed during the information processing in the information processing apparatus 12A.

In the information processing apparatus 12A, the operations performed from Step S100 to Step S112 are identical to the operations performed according to the first embodiment (see FIG. 15). Then, the first obtaining unit 41 obtains the text data corresponding to each piece of utterance data (Step S1130).

Subsequently, the generating unit 30A performs a candidate list generating operation (Step S1140) (described later in detail). Then, in the information processing apparatus 12A, the operations from Step S116 to Step S124 are performed in an identical manner to the operations performed according to the first embodiment. That marks the end of the present routine.

Given below is the explanation of the candidate list generating operation performed by the generating unit 30A at Step S1140.

Figure 22:
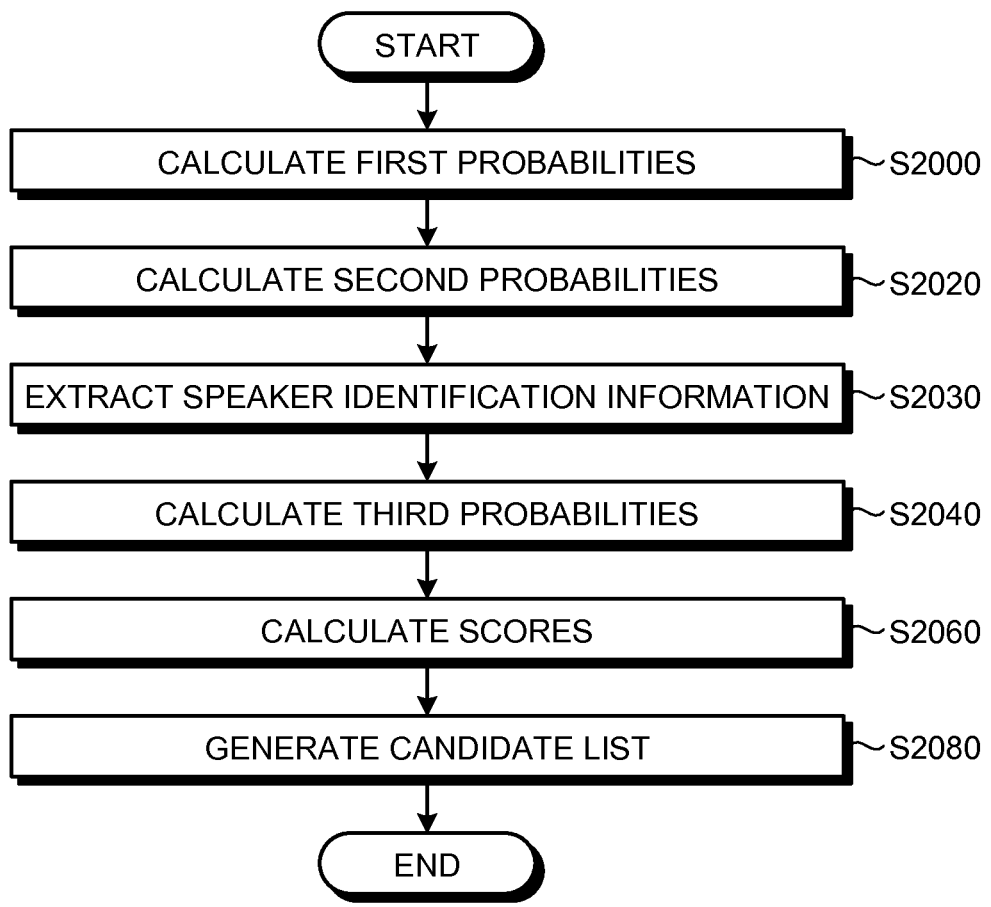
FIG. 22 is a flowchart for explaining a sequence of operations performed during a candidate list generating operation according to the second embodiment.

FIG. 22 is a flowchart for explaining a sequence of operations performed by the generating unit 30A during the candidate list generating operation.

Firstly, in an identical manner to the operation at Step S200 (see FIG. 17) in the first embodiment, the first calculating unit 34 calculates the first probabilities (Step S2000). Then, in an identical manner to the operation at Step S202 (see FIG. 17) in the first embodiment, the second calculating unit 36 calculates the second probabilities (Step S2020).

Subsequently, from among the text data obtained by the first obtaining unit 41 corresponding to each piece of utterance data, the extracting unit 42 at least analyzes the text data of the utterance data that is obtained by the second receiving unit 28 as the utterance data to which a speaker name is to be given and analyzes the text data of the previous piece of utterance data to the utterance data to which a speaker name is to be given; and extracts predetermined speaker identification information specified in those pieces of text data (Step S2030).

Then, the fourth calculating unit 40 calculates the third probabilities based on the operation history information and based on the speaker identification information that has been extracted (Step S2040). Subsequently, the third calculating unit 38A calculates the scores based on the first probabilities calculated by the first calculating unit 34, the second probabilities calculated by the second calculating unit 36, and the third probabilities calculated by the fourth calculating unit 40 (Step S2060).

Then, the generating unit 30A selects a predetermined number of speaker names in descending order of the scores calculated by the third calculating unit 38A, and generates a candidate list in which the selected speaker names are listed as candidate speaker names (Step S2080). That marks the end of the present routine.

As described above, in the information processing system 10A according to the second embodiment, a candidate list is generated by further referring either to the utterance data to which a speaker name is to be given or to the text data corresponding to that utterance data.

For that reason, in the information processing system 10A, in the case when the utterance data to which a speaker name is to be given either contains the speaker identification information that enables identification of the speaker corresponding to that utterance data or contains the speaker identification information in which the speaker of the next piece of utterance data is associated to the previous piece of utterance data, the scores can be calculated by taking into account such speaker identification information.

Moreover, in addition to the effect achieved in the first embodiment, it becomes possible to further enhance the accuracy of the speaker names listed in the candidate list. Furthermore, in addition to the effect achieved in the first embodiment, it becomes possible to provide information that enables the user to easily give the speaker names.

Besides, in the information processing apparatus 12A according to the second embodiment, a candidate list is generated by further referring either to the utterance data to which a speaker name is to be given or to the text data corresponding to that utterance data. Hence, even in the case when there is irregularity in the speaker relay and when speaker names are to be given to pieces of the utterance data that are included in the speech data of a debate session in which the presenter controls the order of utterances, it is possible to provide information that easily enables setting of the speaker names.

Third Embodiment

According to a third embodiment, a candidate list is generated by further referring to reproduction history information of the speech data.

Figure 23:
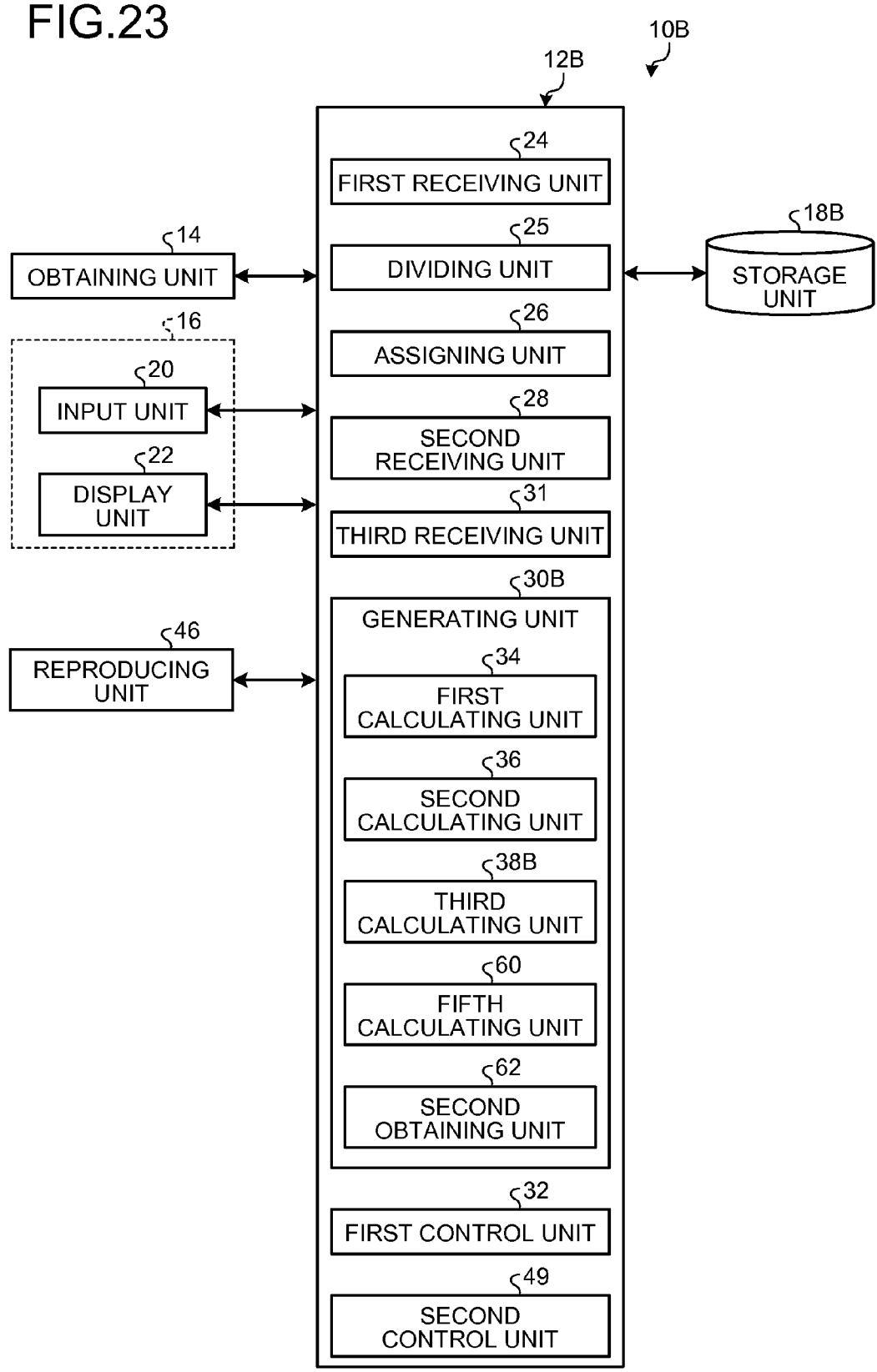
FIG. 23 is a block diagram of an information processing system according to a third embodiment.

FIG. 23 is a block diagram illustrating a functional configuration of an information processing system 10B according to the third embodiment. The information processing system 10B includes the obtaining unit 14, the input unit 20, the display unit 22, an information processing apparatus 12B, a storage unit 18B, and a reproducing unit 46. Herein, the obtaining unit 14, the input unit 20, and the display unit 22 are identical to the description in the first embodiment.

The reproducing unit 46 is a known reproducing device that is capable of reproducing speech data. In the information processing apparatus 12B, while the reproducing unit 46 is reproducing the speech data, the information indicating the current reproducing position in the speech data is displayed on the display unit 22. Moreover, in the information processing apparatus 12B, the reproducing unit 46 selectively reproduces the utterance data that is specified by the user by operating the input unit 20.

The information processing apparatus 12B includes the first receiving unit 24, the dividing unit 25, the assigning unit 26, the second receiving unit 28, the third receiving unit 31, a generating unit 30B, the first control unit 32, and a second control unit 49. Herein, the first receiving unit 24, the dividing unit 25, the assigning unit 26, the second receiving unit 28, the third receiving unit 31, and the first control unit 32 are identical to the description in the first embodiment. The second control unit 49 controls the reproduction of the speech data performed by the reproducing unit 46. Moreover, when the user operates the input unit 20 and selectively specifies a piece of utterance data from the speech data as the reproduction target, the second control unit 49 performs control so that the specified utterance data is reproduced by the reproducing unit 46. At that time, in the storage unit 18B, the second control unit 49 stores, as reproduction history information, the number of times of reproducing the piece of utterance data that has been reproduced.

The storage unit 18B is used not only to store the first data and the operation history information described in the first embodiment but also to store the reproduction history information that indicates the number of times of reproducing each piece of utterance data that was reproduced during a predetermined number of prior reproduction operations. Every time a piece of utterance data is reproduced, the second control unit 49 updates the reproduction history information that is stored in the storage unit 18B.

The generating unit 30B includes the first calculating unit 34, the second calculating unit 36, a third calculating unit 38B, a fifth calculating unit 60, and a second obtaining unit 62. Herein, the first calculating unit 34 and the second calculating unit 36 are identical to the description in the first embodiment.

The second obtaining unit 62 obtains the reproduction history information that indicates the number of times of reproducing each piece of utterance data included in the speech data which is obtained by the first receiving unit 24.

With respect to each speaker name specified in the operation history information; the fifth calculating unit 60 calculates a fourth probability, which indicates the probability at which the utterance data corresponding to that speaker name is reproduced, on the basis of the number of times of reproducing the utterance data corresponding to that speaker name.

FIG. 24 is an explanatory diagram for explaining the fourth probability calculated by the fifth calculating unit 60 with respect to each speaker name. As illustrated in FIG. 24, with respect to each speaker name specified in the operation history information; larger the number of times of reproduction, the greater is the fourth probability calculated by the fifth calculating unit 60.

Returning to the explanation with reference to FIG. 23, the third calculating unit 38B calculates scores based on the first probabilities, the second probabilities, and the fourth probabilities. Herein, a score indicates the probability at which a speaker name specified in the operation history information is given by the user.

FIG. 25 is an explanatory diagram for explaining the score calculation performed by the third calculating unit 38B. In an identical manner to the third calculating unit 38 according to the first embodiment, the third calculating unit 38B reads the first probability and the second probability regarding each speaker name specified in the operation history information. In addition, the third calculating unit 38B reads the fourth probability calculated by the fifth calculating unit 60 regarding each speaker name specified in the operation history information. Then, as the score corresponding to each speaker name specified in the operation history information, the third calculating unit 38B calculates the added value of the first probability, the second probability, and the fourth probability corresponding to that speaker name (see FIG. 25).

Returning to the explanation with reference to FIG. 23, the generating unit 30B selects a predetermined number of speaker names in descending order of the scores calculated by the third calculating unit 38B, and generates a candidate list in which the selected speaker names are listed as candidate speaker names.

Given below is the explanation about a sequence of operations performed during the information processing in the information processing apparatus 12B.

Figure 26:
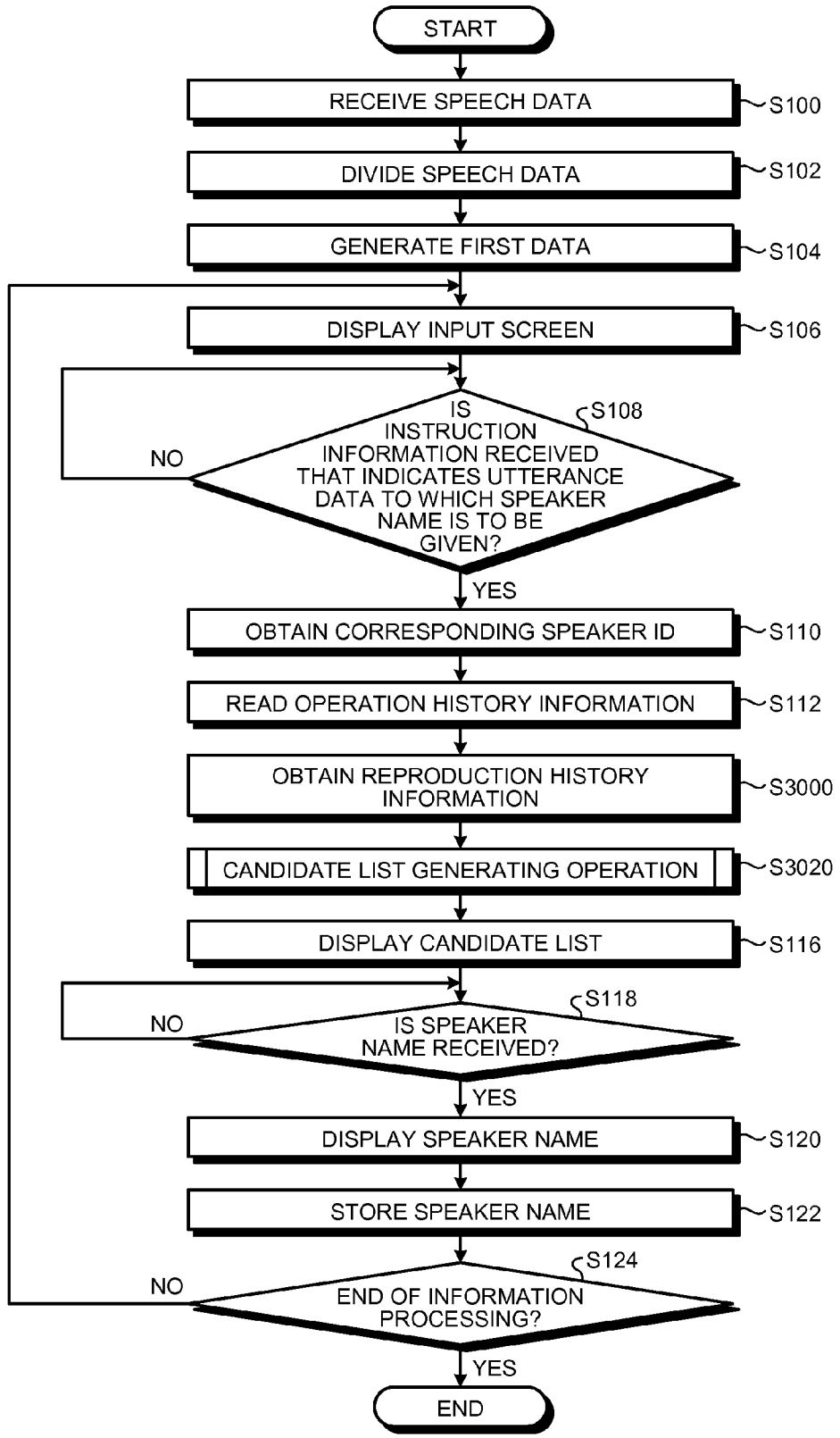
FIG. 26 is a flowchart illustrating a sequence of operations performed according to the third embodiment.

FIG. 26 is a flowchart illustrating a sequence of operations performed during the information processing in the information processing apparatus 12B.

In the information processing apparatus 12B, the operations performed from Step S100 to Step S112 are identical to the operations performed according to the first embodiment (see FIG. 15). Then, the second obtaining unit 62 obtains the reproduction history information that indicates the number of times of reproducing each piece of utterance data included in the speech data which is obtained by the first receiving unit 24 (Step S3000).

Subsequently, the generating unit 30B performs a candidate list generating operation (Step S3020) (described later in detail). Then, in the information processing apparatus 12B, the operations from Step S116 to Step S124 are performed in an identical manner to the operations performed according to the first embodiment. That marks the end of the present routine.

Given below is the explanation of the candidate list generating operation performed by the generating unit 30B at Step S3020.

Figure 27:
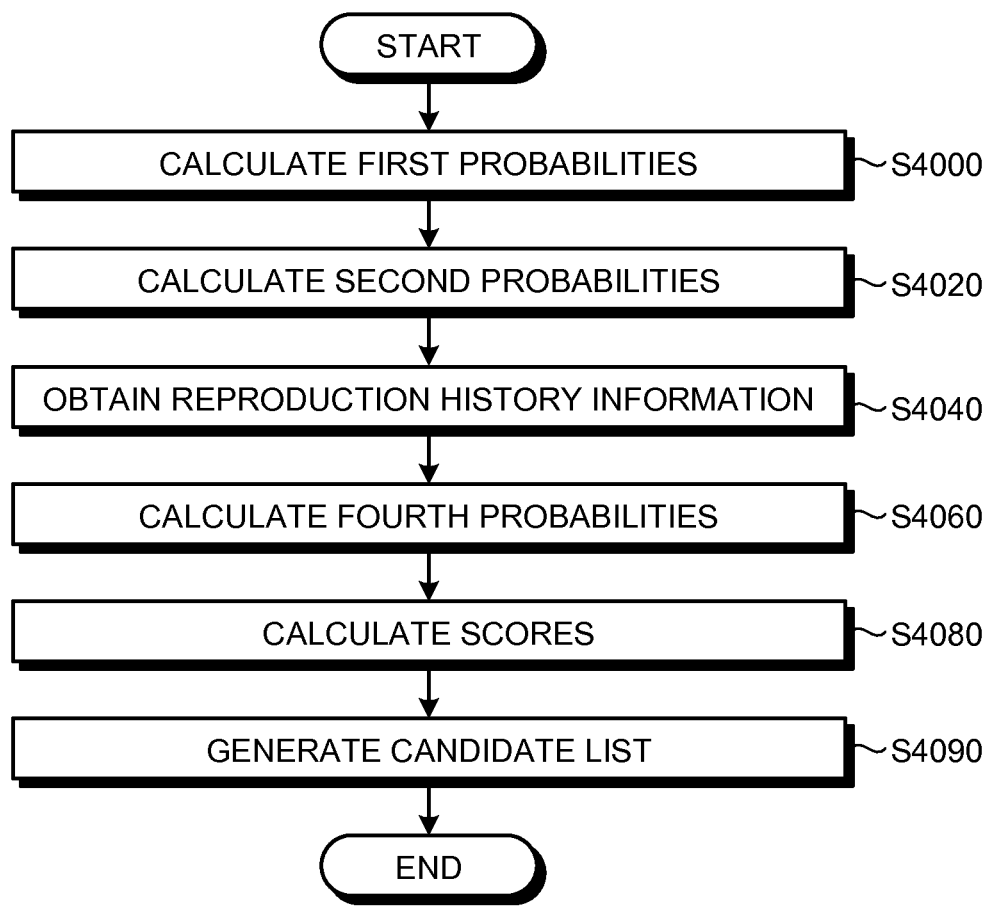
FIG. 27 is a flowchart for explaining a sequence of operations performed during a candidate list generating operation according to the third embodiment.

FIG. 27 is a flowchart for explaining a sequence of operations performed by the generating unit 30B during the candidate list generating operation.

Firstly, in an identical manner to the operation at Step S200 (see FIG. 17) in the first embodiment, the first calculating unit 34 calculates the first probabilities (Step S4000). Then, in an identical manner to the operation at Step S202 (see FIG. 17) in the first embodiment, the second calculating unit 36 calculates the second probabilities (Step S4020).

Subsequently, the second obtaining unit 62 obtains the reproduction history information regarding each piece of utterance data that is included in the speech data (Step S4040). Then, the fifth calculating unit 60 calculates the fourth probabilities (Step S4060).

Subsequently, the third calculating unit 38B calculates the scores based on the first probabilities calculated by the first calculating unit 34, the second probabilities calculated by the second calculating unit 36, and the fourth probabilities calculated by the fifth calculating unit 60 (Step S4080).

Then, the generating unit 30B selects a predetermined number of speaker names in descending order of the scores calculated by the third calculating unit 38B, and generates a candidate list in which the selected speaker names are listed as candidate speaker names (Step S4090). That marks the end of the present routine.

As described above, in the information processing system 10B according to the third embodiment, larger the recent number of times of reproduction with respect to a piece of utterance data included in the speech data, the greater is the calculated score. For that reason, in the information processing system 10B according to the third embodiment, in the candidate list, it becomes possible to list such speaker names on priority which correspond to the pieces of utterance data that are the target for the user to manually confirm similarity in the voice quality.

Hence, in addition to the effect achieved in the first embodiment, it becomes possible to provide information that easily enables setting of speaker names to the utterance data of speakers.

Fourth Embodiment

In each of the first to third embodiments described above, the explanation is given for the case in which the information processing apparatus 12 (or the information processing apparatus 12A or the information processing apparatus 12B) generates as well as displays a candidate list. However, that is not the only possible case.

Alternatively, some of the operations performed the information processing apparatus 12 (or the information processing apparatus 12A or the information processing apparatus 12B) can be performed in another device that is connected via a network.

As an example of that case, in an information processing system 11 according to a fourth embodiment, some of the functions of the information processing apparatus 12 (or the information processing apparatus 12A or the information processing apparatus 12B) are implemented in a server device that is present on a network.

Figure 28:
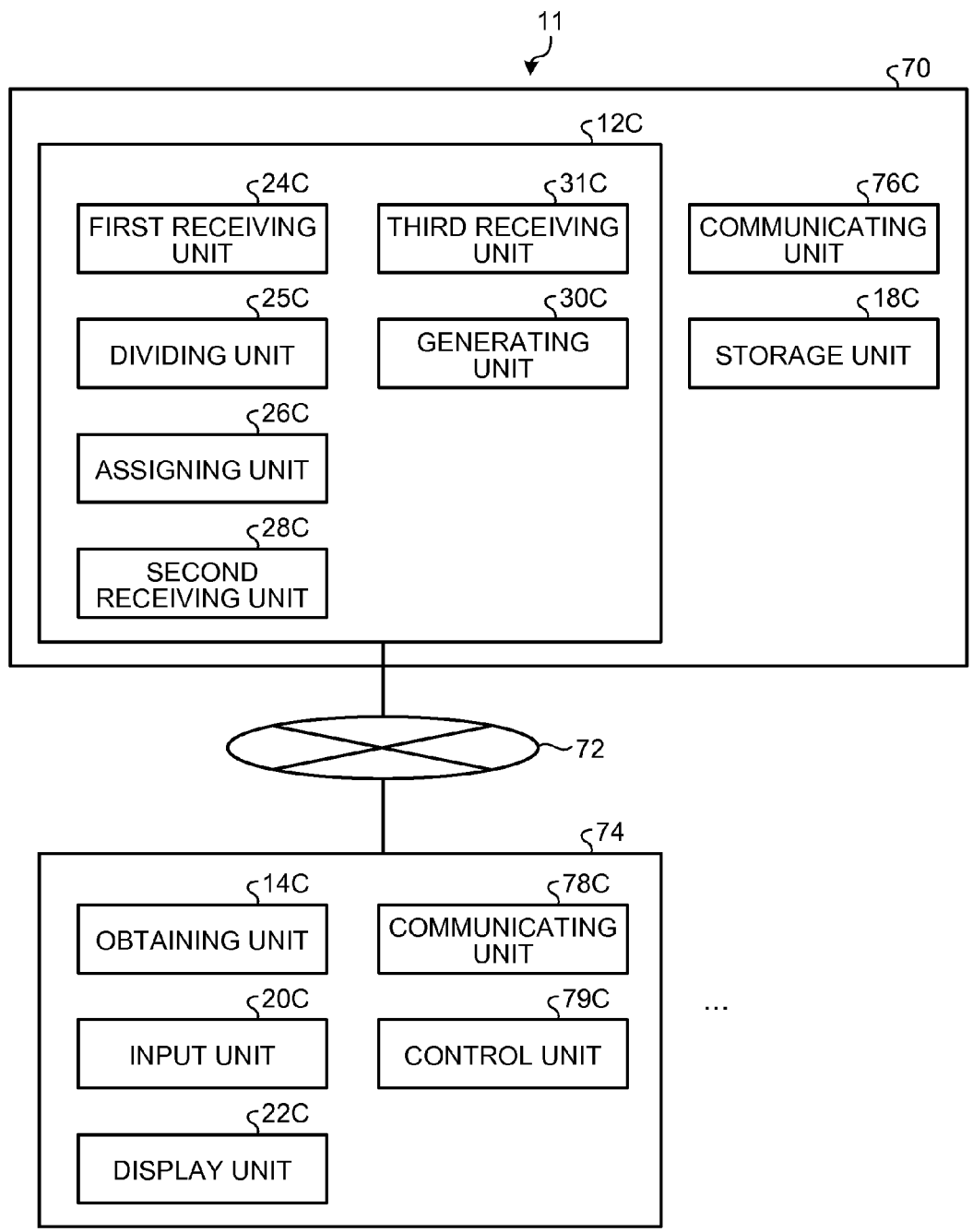
FIG. 28 is a schematic diagram of an information processing system according to a fourth embodiment.

FIG. 28 is a schematic diagram of the information processing system 11 according to the fourth embodiment.

In the information processing system 11; a host device 74 and a server device 70 are connected to each other via a network 72 such as the Internet.

The host device 74 has the hardware configuration of a commonly-used computer in which a CPU, a ROM, a RAM, and an HDD are connected to each other via a bus. Moreover, the host device 74 includes an obtaining unit 14C, an input unit 20C, a display unit 22C, a communicating unit 78C, and a control unit 79C. Herein, the obtaining unit 14C, the input unit 20C, and the display unit 22C are respectively identical to the obtaining unit 14, the input unit 20, and the display unit 22 according to the first embodiment.

The communicating unit 78C is a communication interface for communicating a variety of data with the server device 70 via the network 72. In the fourth embodiment, to the server device 70, the communicating unit 78C sends a variety of information such as speech data that is obtained by the obtaining unit 14C; instruction information that is input by the user by operating the input unit 20C and that indicates the piece of utterance data to which a speaker name is to be given; and speaker names or uttered contents that are input by the user by operating the input unit 20C. On the other hand, from the server device 70, the communicating unit 78C receives various input screens that are to be displayed on the display unit 22C. The control unit 79C controls the operations of the constituent elements of the host device 74. Moreover, the control unit 79C performs control to display the input screens that are received from the server device 70. Furthermore, the control unit 79C performs control to send a variety of information, which has been input from the input unit 20C, to the server device 70 via the network 72.

The server device 70 has the hardware configuration of a commonly-used computer in which a CPU, a ROM, a RAM, and an HDD are connected to each other via a bus. Moreover, the server device 70 includes an information processing unit 12C, a communicating unit 76C, and a storage unit 18C. Herein, the information processing unit 12C has an identical configuration to the configuration of the information processing apparatus 12 according to the first embodiment. More specifically, the information processing unit 12C includes a first receiving unit 24C, a dividing unit 25C, an assigning unit 26C, a second receiving unit 28C, a third receiving unit 31C, and a generating unit 30C. Herein, the first receiving unit 24C, the dividing unit 25C, the assigning unit 26C, the second receiving unit 28C, the third receiving unit 31C, and the generating unit 30C are respectively identical to the first receiving unit 24, the dividing unit 25, the assigning unit 26, the second receiving unit 28, the third receiving unit 31, and the generating unit 30 according to the first embodiment.

The storage unit 18C has an identical configuration to the configuration of the storage unit 18 according to the first embodiment. The communicating unit 76C is an interface for communicating a variety of information with the host device 74 via the network 72. In the fourth embodiment, to the host device 74, the communicating unit 76C sends various input screens that are generated in the information processing unit 12C such as an input screen including a candidate list generated by the generating unit 30C or an input screen that enables selection of the utterance data to which a speaker name is to be given. On the other hand, from the host device 74, the communicating unit 76C receives a variety of information such as instruction information that indicates the utterance data to which a speaker name is to be given or the speaker names or the uttered contents that have been input.

Herein, the operations performed in the information processing system 11 according to the fourth embodiment are identical to the operations performed in the information processing apparatus 12 according to the first embodiment except for the following points: the server device 70 receives a variety of information, which in the first embodiment is received by the information processing apparatus 12 (see FIG. 1) from the input unit 20 (see FIG. 1) or from the obtaining unit 14 (see FIG. 1), from the host device 74; and the server device 70 sends a variety of information, such as the input screens or the candidate list generated in the information processing unit 12C, not to the display unit 22 (see FIG. 1) but to the host device 74.

The host device 74 gets various operations, which in the first embodiment are performed in the information processing apparatus 12, performed in the server device 70. The host device 74 itself only obtains and displays a variety of information. Apart from those points, the operations are identical to the operations performed in the information processing apparatus 12 according to the first embodiment.

Given below is explanation of operations performed in the server device 70.

Figure 29:
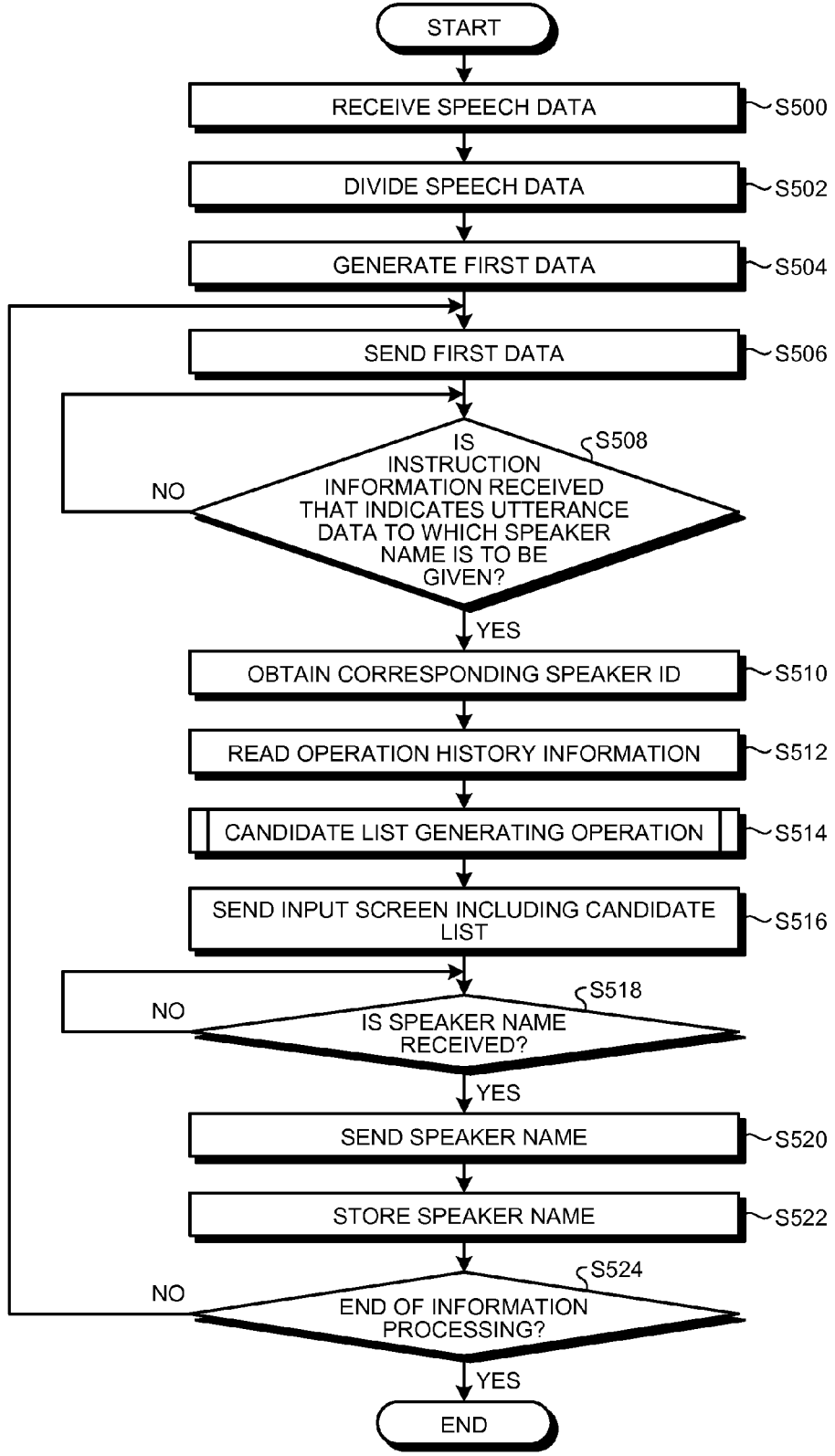
FIG. 29 is a flowchart for explaining a sequence of operations performed according to the fourth embodiment.

FIG. 29 is a flowchart for explaining a sequence of operations performed during the information processing in the server device 70.

Firstly, the first receiving unit 24C receives speech data from the communicating unit 76C of the host device 74 via the network 72 (Step S500). Then, the dividing unit 25C divides the speech data, which is received by the first receiving unit 24C at Step S500, into a plurality of pieces of utterance data (Step S502).

Subsequently, the assigning unit 26C generates the first data (Step S504) in an identical manner to that described in the first embodiment. Then, the assigning unit 26C stores the first data in the storage unit 18C.

Subsequently, to the host device 74, the communicating unit 76C sends an input screen that enables selection of a piece of utterance data to which a speaker name is to be given from among a plurality of pieces of utterance data that are included in the speech data received at Step S500, as well as sends the first data (Step S506).

The second receiving unit 28C determines whether or not instruction information indicating the utterance data to which a speaker name is to be given is received from the host device 74 (Step S508). Until it is determined that the utterance data to which a speaker name is to be given is received from the host device 74 (Yes at Step S508), the second receiving unit 28C repeatedly determines that the utterance data to which a speaker name is to be given is not received from the host device 74 (No at Step S508). Once it is determined that the utterance data to which a speaker name is to be given is received from the host device 74 (Yes at Step S508), the system control proceeds to Step S510.

Then, the generating unit 30C obtains, from the storage unit 18C, the speaker ID corresponding to the utterance ID that is specified in the instruction information received at Step S508 (Step S510); as well as reads the operation history information that is stored in the storage unit 18C (Step S512).

Subsequently, the generating unit 30C performs a candidate list generating operation (Step S514) in an identical manner to the candidate list generating operation (see Step S114 in FIG. 15) according to the first embodiment.

Then, to the host device 74, the communicating unit 76C sends an input screen in which the candidate list, which is generated by the generating unit 30C at Step S514, is displayed in an entry field for entering the speaker name corresponding to the utterance data to which a speaker name is to be given (Step S516).

Subsequently, the third receiving unit 31C determines whether or not the speaker name given by the user to the utterance data to which a speaker name is to be given has been received from the host device 74 (Step S518). Until it is determined that the speaker name given by the user to the utterance data to which a speaker name is to be given has been received from the host device 74 (Yes at Step S518), the third receiving unit 31C repeatedly determines that the speaker name given by the user to the utterance data to which a speaker name is to be given has not been received from the host device 74 (No at Step S518). Once it is determined that the speaker name given by the user to the utterance data to which a speaker name is to be given has been received from the host device 74 (Yes at Step S518), the system control proceeds to Step S520.

Then, the communicating unit 76C sends the speaker name received at Step S518 to the host device 74 (Step S520).

Subsequently, in the operation history information, the third receiving unit 31C stores the speaker name, which is received at Step S518, in a corresponding manner to the utterance ID of the utterance data that is received at Step S508 as the utterance data to which a speaker name is to be given (Step S522). As a result of the operation performed at Step S522, every time the user gives a speaker name to a piece of utterance data, the operation history information stored in the storage unit 18C gets updated.

Then, the information processing unit 12C determines whether or not to end the information processing (Step S524). The information processing unit 12C performs the determination at Step S524 by, for example, determining whether or not a signal indicating the end of information processing is received from the host device 74.

If it is determined not to end the information processing (No at Step S524), then the system control returns to Step S506. On the other hand, if it is determined to end the information processing (Yes at Step S524); then that marks the end of the present routine.

Given below is the explanation of information processing performed in the host device 74.

Figure 30:
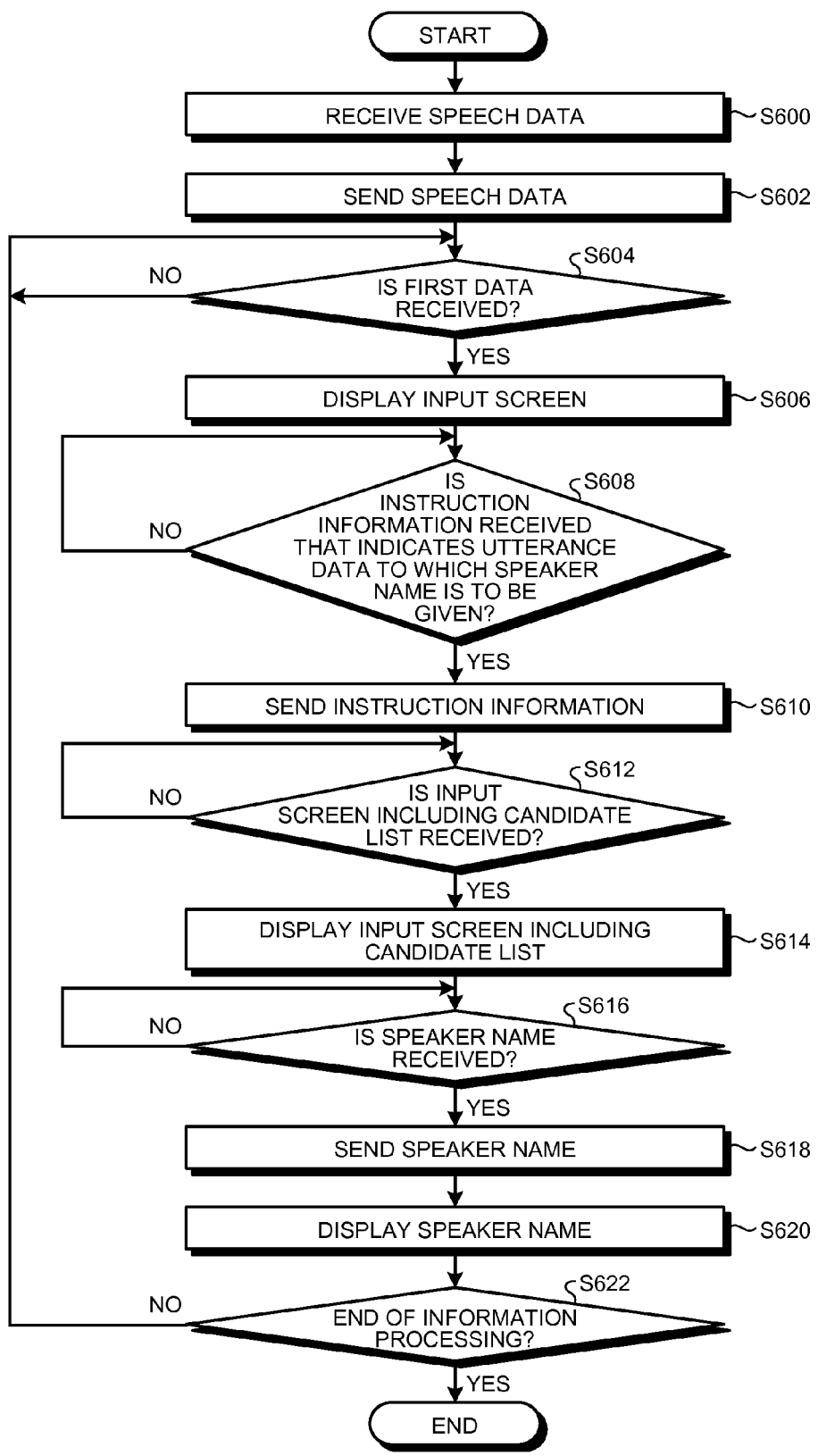
FIG. 30 is a flowchart for explaining a sequence of operations performed according to the fourth embodiment.

FIG. 30 is a flowchart for explaining a sequence of operations performed during the information processing in the host device 74.

Firstly, the obtaining unit 14C receives speech data (Step S600). Then, the communicating unit 78C sends the speech data, which is received at Step S600, to the server device 70 (Step S602).

Subsequently, until it is determined that an input screen and the first data is received from the server device (Yes at Step S604), the communicating unit 78C repeatedly determines that the input screen and the first data is not received from the server device 70 (No at Step S604). Once it is determined that an input screen and the first data is received from the server device 70 (Yes at Step S604), the system control proceeds to Step S606.

Then, the control unit 79C performs control to display the input screen, which is received at Step S604, on the display unit 22C (Step S606).

Subsequently, the control unit 79C determines whether or not instruction information indicating the utterance data to which a speaker name is to be given is received from the user (Step S608). Herein, the control unit 79C performs the determination at Step S608 by determining whether or not the instruction information is received from the input unit 20C as a result of an operation of the input unit 20C by the user.

Until it is determined that the utterance data to which a speaker name is to be given is received from the user (Yes at Step S608), the control unit 79C repeatedly determines that the utterance data to which a speaker name is to be given is not received from the user (No at Step S608). Once it is determined that the utterance data to which a speaker name is to be given is received from the user (Yes at Step S608), the system control proceeds to Step S610.

Then, the communicating unit 78C sends the instruction information, which is received at Step S608, to the server device 70 (Step S610).

Subsequently, until an input screen, in which a candidate list is displayed in an entry field for entering the speaker name corresponding to the utterance data to which a speaker name is to be given, is received from the server device 70 (Yes at Step S612), the communicating unit 78C repeatedly determines that the input screen is not received from the server device 70 (No at Step S612). Once the input screen is received from the server device 70 (Yes at Step S612), the system control proceeds to Step S614. Then, the control unit 79C displays the input screen, which is received at Step S612, on the display unit 22C (Step S614). As a result, on the display unit 22C, the candidate list gets displayed in the entry field for entering the speaker name corresponding to the utterance data that is received at Step S608 as the utterance data to which a speaker name is to be given.

Subsequently, the control unit 79C determines whether or not the speaker name given by the user to the utterance data to which a speaker name is to be given has been received from the input unit 20C (Step S616). Until it is determined that the speaker name given by the user to the utterance data to which a speaker name is to be given has been received from the input unit 20C (Yes at Step S616), the control unit 79C repeatedly determines that the speaker name given by the user to the utterance data to which a speaker name is to be given has not been received from the input unit 20C (No at Step S616). Once it is determined that the speaker name given by the user to the utterance data to which a speaker name is to be given has been received from the input unit 20C (Yes at Step S616), the system control proceeds to Step S618.

Then, the communicating unit 78C sends the speaker name, which is received at Step S616, to the server device 70 (Step S618). Moreover, the control unit 79C displays the speaker name, which is received at Step S616, in a display field for displaying the speaker name of the utterance data that is received at Step S608 as the utterance data to which a speaker name is to be given (Step S620).

Then, the control unit 79C determines whether or not to end the information processing (Step S622). The control unit 79C performs the determination at Step S622 by, for example, determining whether or not a signal indicating the end of information processing is received as a result of an operation of the input unit 20C by the user.

If it is determined not to end the information processing (No at Step S622), then the system control returns to Step S604. On the other hand, if it is determined to end the information processing (Yes at Step S622); then that marks the end of the present routine.

As described above, in the fourth embodiment, some of the functions of the information processing apparatus 12 (or the information processing apparatus 12A or the information processing apparatus 12B) are implemented in the server device 70 that is present on the network 72; and the candidate list is generated in the server device 70. For that reason, in addition to the effect achieved in the first embodiment, even in the case when a plurality of host devices 74 is present, the operation history information can be updated in a collective manner.

Fifth Embodiment

Each of the information processing apparatus 12 according to the first embodiment, the information processing apparatus 12A according to the second embodiment, the information processing apparatus 12B according to the third embodiment, the server device 70 according to the fourth embodiment, and the host device 74 according to the fourth embodiment has the hardware configuration of a commonly-used computer in which a CPU, a ROM, a RAM, and a HDD are connected to each other via a bus.

The computer programs that are executed for performing the abovementioned information processing in the information processing apparatus 12 according to the first embodiment, the information processing apparatus 12A according to the second embodiment, the information processing apparatus 12B according to the third embodiment, the server device 70 according to the fourth embodiment, and the host device 74 according to the fourth embodiment are stored in advance in the ROM and provided as a computer program product.

Alternatively, the computer programs that are executed for performing the abovementioned information processing in the information processing apparatus 12 according to the first embodiment, the information processing apparatus 12A according to the second embodiment, the information processing apparatus 12B according to the third embodiment, the server device 70 according to the fourth embodiment, and the host device 74 according to the fourth embodiment can be recorded in the form of installable or executable files in a computer-readable recording medium such as a compact disk read only memory (CD-ROM), a flexible disk (FD), a compact disk readable (CD-R), or a digital versatile disk (DVD), and provided as a computer program product.

Still alternatively, the computer programs that are executed for performing the abovementioned information processing in the information processing apparatus 12 according to the first embodiment, the information processing apparatus 12A according to the second embodiment, the information processing apparatus 12B according to the third embodiment, the server device 70 according to the fourth embodiment, and the host device 74 according to the fourth embodiment can be saved as downloadable files on a computer connected to the Internet or can be made available for distribution through a network such as the Internet.

As a result of executing the computer programs for performing the abovementioned information processing in the information processing apparatus 12 according to the first embodiment, the information processing apparatus 12A according to the second embodiment, the information processing apparatus 12B according to the third embodiment, the server device 70 according to the fourth embodiment, and the host device 74 according to the fourth embodiment; each of the abovementioned constituent elements is generated in a main memory device.

Meanwhile, the variety of information stored in the HDD, that is, the variety of information stored in the storage unit 18, the storage unit 18A, and the storage unit 18B can also be stored in an external device (such as a server). In this case, the configuration can be such that the external device is connected via a network to the information processing apparatus 12, or the information processing apparatus 12A, or the information processing apparatus 12B, or the server device 70 and the host device 74.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first receiving unit configured to receive speech data containing pieces of utterance data of speakers;
a dividing unit configured to divide the speech data into the pieces of utterance data;
an assigning unit configured to assign speaker identification information to each piece of utterance data based on an acoustic feature of the each piece of utterance data;
a second receiving unit configured to receive, from a user, instruction information that indicates a piece of utterance data to which a speaker name is to be given from among the pieces of utterance data included in the speech data;
a generating unit configured to generate a candidate list in which candidate speaker names are arranged in a descending order of scores, each score being indicative of a likelihood at which a corresponding speaker name is given by the user, the candidate speaker names being for the user to determine a speaker name to be given to the piece of utterance data identified by the instruction information, based on operation history information in which at least pieces of utterance identification information for identifying the respective pieces of utterance data, pieces of the speaker identification information that has been assigned to the respective pieces of utterance data, and speaker names given by the user to the respective pieces of utterance data identified by the pieces of speaker identification information are associated with one another; and
a first control unit configured to perform control so as to display the candidate list in an entry field for entering a speaker name that corresponds to the utterance data identified with the utterance identification.

2. The apparatus according to claim 1, wherein the generating unit generates the candidate list that indicates the correspondence between the candidate speaker names and probabilities at which the candidate speaker names are given to the piece of utterance data identified by the instruction information based on the operation history information.

3. The apparatus according to claim 1, wherein
each piece of utterance identification information enables unique identification of a piece of utterance data as well as indicates the chronological sequence of the piece of utterance data in the speech data,
the generating unit includes
a first calculating unit configured to calculate, from a correspondence relationship between the pieces of speaker identification information and the speaker names specified in the operation history information, first probabilities that indicate probabilities at which the speaker names are associated with the respective pieces of speaker identification information;
a second calculating unit configured to calculate second probabilities each of which indicates a probability at which each speaker name specified in the operation history information is given subsequent to the speaker name corresponding to a chronologically previous piece of utterance data; and
a third calculating unit configured to calculate a score that indicates a likelihood at which the speaker name is given to the piece of utterance data to which a speaker name is to be given based on the piece of speaker identification information corresponding to the piece of utterance data identified by the instruction information, based on the corresponding first probability, and based on the corresponding second probability, for each speaker name specified in the operation history information, and
the generating unit selects a predetermined number of speaker names in descending order of the scores calculated by the third calculating unit, and generates the candidate list that indicates the selected speaker names as the candidate speaker names.

4. The apparatus according to claim 3, wherein the generating unit selects a predetermined number of speaker names in descending order of the scores calculated by the third calculating unit, and generates the candidate list in which the speaker names are arranged in descending order of the scores.

5. The apparatus according to claim 3, wherein
the operation history information further contains text data set by the user with respect to the piece of utterance data identified by the piece of utterance identification information,
the generating unit further includes
an extracting unit configured to extract, from at least the piece of utterance data to which a speaker name is to be given, the piece of speaker identification information belonging to each speaker name specified in the operation history information; and
a fourth calculating unit configured to calculate third probabilities each of which indicates a probability at which the text data of at least the utterance data to which a speaker name is to be given contains the piece of speaker identification information belonging to each speaker name specified in the operation history information, and
the third calculating unit calculates the score based on the piece of speaker identification information corresponding to the piece of utterance data identified by the instruction information, based on the corresponding first probability, based on the corresponding second probability, and based on the corresponding third probability, for each speaker name specified in the operation history information.

6. The apparatus according to claim 3, wherein
the operation history information further contains the number of times of reproducing each piece of utterance data, which is identified by the utterance identification information, during a predetermined number of prior reproduction operations,
the generating unit further includes
a second obtaining unit configured to obtain the recent number of times of reproducing each piece of utterance data included in the speech data, respectively; and
a fifth calculating unit configured to calculate a fourth probability that indicates a probability of reproducing the piece of utterance data corresponding to the speaker name based on the number of times of reproducing the piece of utterance data corresponding to the speaker name, for each speaker name specified in the operation history information, and the third calculating unit calculates a score that indicates a likelihood at which the speaker name is given to the piece of utterance data to which a speaker name is to be given, based on the piece of speaker identification information corresponding to the piece of utterance data identified by the instruction information, based on the corresponding first probability, based on the corresponding second probability, and based on the corresponding fourth probability, for each speaker name specified in the operation history information.

7. A computer program product comprising a non-transitory computer-readable medium containing a program executed by a computer, the program causing the computer to execute:

receiving speech data containing pieces of utterance data of speakers;

dividing the speech data into the pieces of utterance data;

assigning speaker identification information to each piece of utterance data based on an acoustic feature of the each piece of utterance data;

receiving, from a user, instruction information that indicates a piece of utterance data to which a speaker name is to be given from among the pieces of utterance data included in the speech data;

generating a candidate list in which candidate speaker names are arranged in a descending order of scores, each score being indicative of a likelihood at which a corresponding speaker name is given by the user, the candidate speaker names being for the user to determine a speaker name to be given to the piece of utterance data identified by the instruction information, based on operation history information in which at least pieces of utterance identification information for identifying the respective pieces of utterance data, pieces of the speaker identification information that has been assigned to the respective pieces of utterance data, and speaker names given by the user to the respective pieces of utterance data identified by the pieces of speaker identification information are associated with one another; and performing control so as to display the candidate list in an entry field for entering a speaker name that corresponds to the utterance data identified with the utterance identification.

8. An information processing method comprising:

receiving speech data containing pieces of utterance data of speakers;

dividing the speech data into the pieces of utterance data;

assigning speaker identification information to each piece of utterance data based on an acoustic feature of the each piece of utterance data;

receiving, from a user, instruction information that indicates a piece of utterance data to which a speaker name is to be given from among the pieces of utterance data included in the speech data;

generating a candidate list in which candidate speaker names are arranged in a descending order of scores, each score being indicative of a likelihood at which a corresponding speaker name is given by the user, the candidate speaker names being for the user to determine a speaker name to be given to the piece of utterance data identified by the instruction information, based on operation history information in which at least pieces of utterance identification information for identifying the respective pieces of utterance data, pieces of the speaker identification information that has been assigned to the respective pieces of utterance data, and speaker names given by the user to the respective pieces of utterance data identified by the pieces of speaker identification information are associated with one another; and performing control so as to display the candidate list in an entry field for entering a speaker name that corresponds to the utterance data identified with the utterance identification.

* * * * *